United States Patent
Duenckel et al.

(10) Patent No.: US 10,316,242 B2
(45) Date of Patent: Jun. 11, 2019

(54) COMPOSITION AND METHOD FOR HYDRAULIC FRACTURING AND EVALUATION AND DIAGNOSTICS OF HYDRAULIC FRACTURES USING INFUSED POROUS CERAMIC PROPPANT

(71) Applicant: CARBO Ceramics Inc., Houston, TX (US)

(72) Inventors: Robert Duenckel, Southlake, TX (US); Mark Conner, Tomball, TX (US); Chad Cannan, Cypress, TX (US); Daniel Cady, Houston, TX (US); Joshua Leasure, Houston, TX (US); Thu Lieng, Richmond, TX (US); Todd Roper, Katy, TX (US); Peter A. Read, Dorchester (GB)

(73) Assignee: CARBO Ceramics Inc., Houston, TX (US)

( * ) Notice: Subject to any disclaimer, the term of this patent is extended or adjusted under 35 U.S.C. 154(b) by 693 days.

(21) Appl. No.: 14/213,276

(22) Filed: Mar. 14, 2014

(65) Prior Publication Data

US 2014/0262247 A1  Sep. 18, 2014

Related U.S. Application Data

(60) Provisional application No. 61/787,724, filed on Mar. 15, 2013, provisional application No. 61/803,652, (Continued)

(51) Int. Cl.
*C09K 8/80* (2006.01)
*E21B 43/267* (2006.01)
(Continued)

(52) U.S. Cl.
CPC .......... *C09K 8/80* (2013.01); *C09K 8/66* (2013.01); *E21B 43/26* (2013.01); *E21B 43/267* (2013.01);
(Continued)

(58) Field of Classification Search
CPC ........ C09K 2208/10; C09K 8/66; C09K 8/80; E21B 43/26; E21B 43/267; E21B 47/1015
See application file for complete search history.

(56) References Cited

U.S. PATENT DOCUMENTS 3,796,883 A   3/1974  Smith et al.
3,987,850 A  10/1976  Fitch
(Continued)

FOREIGN PATENT DOCUMENTS

WO   WO 9936668 A1 *  7/1999  ............... C09K 8/92
WO   WO 2012/136734   10/2012

OTHER PUBLICATIONS

Revkin, Andrew C., "*Ideas to Watch in 2013: Traceable Gas-Drilling Fluids*", The New Your Times. Jan. 8, 2013, 4 pages.
(Continued)

*Primary Examiner* — Alicia Bland
(74) *Attorney, Agent, or Firm* — Patterson + Sheridan, LLP

(57) ABSTRACT

A composition and method for hydraulically fracturing an oil or gas well to improve the production rates and ultimate recovery using a porous ceramic proppant infused with a chemical treatment agent is provided. The chemical treatment agent may be a tracer material that provides diagnostic information about the production performance of a hydraulic fracture stimulation by the use of distinguishable both water soluble and hydrocarbon soluble tracers. The tracer can be a biological marker, such as DNA. The porous ceramic prop-
(Continued)

pant can be coated with a polymer which provides for controlled release of the chemical treatment agent into a fracture or well bore area over a period of time.

45 Claims, 5 Drawing Sheets

Related U.S. Application Data filed on Mar. 20, 2013, provisional application No. 61/883,788, filed on Sep. 27, 2013, provisional application No. 61/885,334, filed on Oct. 1, 2013, provisional application No. 61/914,441, filed on Dec. 11, 2013, provisional application No. 61/929,761, filed on Jan. 21, 2014.

(51) Int. Cl.
    E21B 47/10      (2012.01)
    E21B 43/26      (2006.01)
    C09K 8/66       (2006.01)

(52) U.S. Cl.
    CPC ...... E21B 47/1015 (2013.01); C09K 2208/10 (2013.01)

(56) References Cited

U.S. PATENT DOCUMENTS

| | | | |
|---|---|---|---|
| 4,068,718 A | 1/1978 | Cooke, Jr. et al. | |
| 4,415,805 A | 11/1983 | Fertl et al. | |
| 4,427,068 A * | 1/1984 | Fitzgibbon | E21B 43/267 166/280.2 |
| 5,964,291 A | 10/1999 | Bourne et al. | |
| 6,209,643 B1 | 4/2001 | Nguyen et al. | |
| 6,723,683 B2 | 4/2004 | Crossman et al. | |
| 7,380,606 B2 | 6/2008 | Pursley et al. | |
| 7,431,089 B1 * | 10/2008 | Couillet | C09K 8/72 166/307 |
| 7,598,209 B2 | 10/2009 | Kaufman et al. | |
| 2004/0040708 A1 | 3/2004 | Stephenson et al. | |
| 2004/0043906 A1 | 3/2004 | Heath et al. | |
| 2005/0059558 A1 | 3/2005 | Blauch et al. | |
| 2006/0124301 A1 * | 6/2006 | Gupta | C09K 8/516 166/279 |
| 2007/0173417 A1 | 7/2007 | Kaufman et al. | |
| 2009/0008093 A1 | 1/2009 | Duenckel | |
| 2010/0096139 A1 | 4/2010 | Holcomb et al. | |
| 2010/0307745 A1 | 12/2010 | Lafitte et al. | |
| 2011/0240287 A1 | 10/2011 | Hartshorne et al. | |
| 2012/0080588 A1 * | 4/2012 | Smith, Jr. | G01V 5/101 250/269.6 |
| 2012/0241157 A1 * | 9/2012 | Pope | B28B 1/004 166/308.1 |
| 2012/0295114 A1 * | 11/2012 | Rediger | B22C 1/2246 428/404 |

OTHER PUBLICATIONS

International Search Report and Written Opinion for PCT/US2014/028886, prepared by ISA/US, dated Sep. 19, 2014, 28 pages.
Eurasian Office Action in related application EU No. 201591566 dated Feb. 10, 2017.
Office Action for Australian Application No. 2014229028 dated Jan. 23, 2018.
Office Action for Eurasian Application No. 201591566 dated Oct. 13, 2017.
Office Action for Eurasian Application No. 201591566 dated Mar. 10, 2017.
Office Action for Chinese Application No. 201480027579.9 dated Dec. 26, 2018.
Webb et al, Economic and Technical Advantages of Revolutionary New Chemical Delivery System for Fractured and Gravel Packed Wells, Offshore Europe, Jan. 1, 1997, whole document.
Office Action for Saudi Arabian Application No. 515361159 dated Jun. 25, 2018.
Office Action for Mexican Application No. MX/a/2015/012139 dated Jul. 25, 2018.
Office Action for EPC Application No. 14765809.0 dated Aug. 7, 2018.
Duenckel et al, Improvements in Downhole Chemical Delivery: Development of Multifunctional Proppants, SPE Hydraulic Fracturing Technology Conference, Feb. 6, 2016, whole document.
Office Action for Chinese Application No. 201480027579.9 dated Sep. 14, 2018.
Office Action for Eurasian Patent Application No. 201591566 dated Jan. 14, 2019.
Office Action for Australian Application No. 2018200738 dated Mar. 15, 2019.

* cited by examiner

COMPOSITION AND METHOD FOR HYDRAULIC FRACTURING AND EVALUATION AND DIAGNOSTICS OF HYDRAULIC FRACTURES USING INFUSED POROUS CERAMIC PROPPANT

TECHNICAL FIELD

The present invention relates to methods for hydraulically fracturing an oil or gas well to improve the production rates and ultimate recovery with porous ceramic proppant infused with a chemical treatment agent.

The present invention also relates to methods for evaluating the effectiveness and performance of a hydraulic fracturing stimulation treatment in an oil or gas well with porous ceramic proppant infused with a biological marker.

BACKGROUND

In order to stimulate and more effectively produce hydrocarbons from oil and gas bearing formations, and especially formations with low porosity and/or low permeability, induced fracturing (called "frac operations", "hydraulic fracturing", or simply "fracing") of the hydrocarbon-bearing formations has been a commonly used technique. In a typical hydraulic fracturing operation, fluid slurries are pumped downhole under high pressure, causing the formations to fracture around the borehole, creating high permeability conduits that promote the flow of the hydrocarbons into the borehole. These frac operations can be conducted in vertical, horizontal or deviated boreholes, and in either intervals of uncased wells, or in cased wells through perforations.

In cased boreholes in vertical wells, for example, the high pressure fluids exit the borehole via perforations through the casing and surrounding cement, and cause the oil and gas formations to fracture, usually in thin, generally vertical sheet-like fractures in the deeper formations in which oil and gas are commonly found. These induced fractures generally extend laterally a considerable distance out from the wellbore into the surrounding formations, and extend vertically until the fracture reaches a formation that is not easily fractured above and/or below the desired frac interval. The directions of maximum and minimum horizontal stress within the formation determine the azimuthal orientation of the induced fractures.

The high pressure frac fluids typically contain particulate materials called proppant. Proppant is generally composed of sand, resin-coated sand or ceramic particles, and the fluid used to pump the proppant downhole is typically designed to be sufficiently viscous to assist in entraining the proppant particles in the fluid as it moves downhole and out into the induced fractures.

After the proppant has been placed in the fracture and the fluid pressure relaxed, the fracture is prevented from completely closing by the presence of the proppants which thus provide a high conductivity flow path to the wellbore which results in improved production performance from the stimulated well.

When the fracture closes, a compressive "closure" stress (often exceeding 10,000 psi) is placed on the proppant. At closures stresses exceeding about 5,000 psi, sand and resin-coated sand proppants lose much of their ability to provide a conductive conduit in the fracture for formation fluids. The sand grains fail or are crushed under these stresses resulting in the generation of fines and a consequent reduction of porosity and permeability within the fracture. Resin-coating of the sand can reduce the generation of fines and extend the utility of sands to some degree. Ceramic proppants are much stronger than sands and resin-coated sands, however, and can provide much greater conductivity in the fracture at all closure stresses. Consequently, ceramic proppants are often used to provide much greater conductivity in the created fracture to improve the production rates and hydrocarbon recoveries.

Ceramic proppants may be manufactured from a variety of starting raw materials which, along with the manufacturing process employed, will define the performance characteristics of the proppant. FIG. 1 shows comparisons of the permeability of three types of common ceramic proppants: a lightweight proppant, an intermediate density proppant and a high density proppant. These proppants differ primarily due to the composition of the starting raw materials from which they are made. In the case of lightweight ceramic proppant, the starting raw material is typically kaolin clay containing approximately 50% alumina oxide ($Al_2O_3$). The starting raw material for an intermediate density ceramic proppant is typically a bauxitic clay containing about 75% alumina oxide and the starting raw material for a high density ceramic proppant is also typically a bauxitic clay but with an alumina oxide content of about 85%. The differences in alumina content of the starting raw materials lead to differences in the final crystalline structure of the sintered ceramic proppant and thus differences in the mechanical properties of the three types of ceramic proppants. These comparisons assume somewhat similar processing characteristics. Proppant of similar alumina content may vary in performance due to variability in the quality of the processing. Further, a combination of higher alumina content with improved processing may lead to even higher conductivities.

For many oil and gas wells the composition of the fluids produced which include hydrocarbons, hydraulic fracturing fluids, and formation waters is such that it is beneficial to add to the fluids a chemical treatment agent to inhibit deleterious properties which the fluids might otherwise exhibit.

Typical chemical treatment agents provide some function that is useful for the production performance of a hydraulically fractured well. For example, the produced fluids may be corrosive to the well casing so a corrosion inhibitor may be added to the fracturing fluid or subsequently pumped into the producing formation in a "squeeze operation". In another example, paraffin or wax control is desirable to control the deposition of higher molecular weight hydrocarbons in an oil and gas stream.

The deposition of paraffin or wax inhibits flow, and if it occurs downhole can reduce well production by "choking off" the well in the area of deposition. The effectiveness of wax inhibitors is generally measured using techniques that report pour point or pour point depression, which is the temperature at which a particular crude oil sample is "pourable" by standard measurement techniques. Another commonly used test method is the "wax appearance temperature" which uses an optical technique to determine the temperature at which wax or wax crystals first appear. By either of these test methods, a lowering of the measured temperature is the objective of the paraffin or wax inhibitor. Paraffin inhibitors are typically classified by function. Those inhibitors that affect the wax appearance temperature are usually referred to as wax inhibitors or wax crystal modifiers. Those inhibitors that affect the pour point are referred to as pour point depressors (PPD) or flow improvers. There is significant overlap in the structure and function of these two types of inhibitors and suitable inhibitors generally include ethylene polymers and copolymers, combination polymers, and branched polymers with long alkyl chains.

Many other types of chemical treatment agents may also be used in the prevention of various deleterious reactions that may occur in oil and gas wells including scale inhibitors, hydrate inhibitors, asphaltene inhibitors and other organic deposition inhibitors, biocides, demulsifiers and other oilfield treatment chemicals.

One technique for delivering such chemical treatment agents downhole includes infusing porous ceramic proppant particulates with the chemical treat agent. As described in U.S. Pat. No. 5,964,291 and U.S. Pat. No. 7,598,209, the fraction of chemically infused proppant added to standard proppant in a hydraulic fracturing operation is determined by the amount of the chemical treatment agent that is desired to be incorporated in the fracturing operation. This in turn is a function of the porosity of the porous ceramic proppant particulates and the degree to which the chemical treatment agent can be placed in the pore spaces of the porous ceramic proppant particulates.

U.S. Pat. No. 5,964,291 discloses that porous ceramic proppants may be sufficiently strong to be used on their own or in conjunction with particles of non-porous materials. However the changes in conductivity of the propped fracture resulting from the use of the porous ceramic proppant as compared to standard proppant is not disclosed. It is further disclosed that the porous particles should comply with API specifications for crush resistance but again the relationship to conductivity impairment is not disclosed. No method for mitigating conductivity impairment should it occur is disclosed.

U.S. Pat. No. 7,598,209 similarly discloses that porous proppants may be sufficiently strong to be used on their own or in conjunction with particles of non-porous materials again without disclosure of the effects on conductivity. It is further disclosed that the porous particulate may be any porous ceramic particulate that has requisite physical properties such as desired strength to fit particular downhole conditions but no disclosure of what this means is offered. U.S. Pat. No. 7,598,209 offers one example of conductivity impairment in which the conductivity and permeability of a typical frac sand—a 20/40 mesh Ottawa—is compared to a 20/40 mesh Ottawa sand containing 10% of a ceramic proppant with 12% porosity that has been chemically infused. The data presented show a conductivity reduction of 8%, 20% and 24% at 2 k, 4 k and 6 k psi closure stress respectively when the porous ceramic is added to the Ottawa sand.

In many instances, the chemical treatment agent must first be dissolved in an aqueous, organic or inorganic solvent to enable the infusion of the chemical treatment agent into the porous ceramic proppant particulates. If the chemical treatment agent is too viscous, however, this can result in lower effective amounts of the chemical treatment agent being present in the infused proppant than desired or uneven or ineffective infusion altogether. Dissolving the chemical treatment agent in the solvent is also an additional step that can be costly and time consuming. It would therefore be beneficial to infuse a chemical treatment agent directly into porous ceramic proppant particulates without the need for a solvent.

Tracers have been used in connection with hydraulic fracturing, to provide certain types of diagnostic information about the location and orientation of the fracture. For example, U.S. Pat. No. 3,987,850 and U.S. Pat. No. 3,796,883 describe the use of radio-active tracers to monitor the functioning of a well gravel pack. Tracers for hydraulic fracturing have been associated with various carrier materials as particles from which the tracer itself is released after placement in the created hydraulic fracture. U.S. Pat. No. 6,723,683 discloses starch particles as a carrier for a variety of oilfield chemicals including tracers. U.S. Patent Application Publication No. 2010/0307745 discloses the use of tracer particles in conjunction with hydraulic fracturing in which the tracer particles are composed of a tracer substance and a carrier wherein the carrier is comprised of starch or polymeric materials.

Carriers such as starch or polymeric materials are weak materials which if added to standard proppant, and particularly a ceramic proppant, in a hydraulic fracture can negatively affect conductivity. Further, the densities of starch or polymeric carrier materials are not similar to proppants typically used in hydraulic fracturing resulting in density segregation which can lead to non-uniform distribution of the tracer chemicals in the created fracture.

Tracers incorporated into hydraulic fracturing operations can provide information to operators which can enable them to improve completion and stimulation programs. This is accomplished by placing one or more unique tracers in various portions of the fracturing operation, such as in different stages if multiple fracturing stages are performed in the well or in different portions of a stage. Analysis of the produced fluids for the presence of the tracers can provide diagnostic information as to which stages or portions of a stage are in contact with the produced fluids. Tracers which differentially partition into the hydrocarbon or water phases can provide further diagnostic data regarding the relative hydrocarbon to water ratio of the produced fluids from a stage.

Nanoparticle dispersions and surfactants have been used in connection with hydraulic fracturing to provide improved fluid production from a well. For example, U.S. Patent Publication No. 2010/0096139 describes the use of a fluid mixture of nanoparticles and a wetting agent that is injected or pumped into a well to enhance the wetting characteristics of the formation surfaces. Similarly, U.S. Pat. No. 7,380,606 describes the use of a solvent-surfactant blend that is injected or pumped into a subterranean formation to improve fluid recovery.

The wetting characteristics, or wettability, of a solid surface is defined as the preference of the solid surface to come into contact with the wetting phase, i.e., a liquid, such as water or oil, or a gas. Wettability has an impact on qualities such as permeability and conductivity. For example, a water-wet formation or proppant surface—one that exhibits a preference for coming into contact with water as opposed to a hydrocarbon—may lead to decreased hydrocarbon permeability and therefore decreased hydrocarbon recovery. Other chemical treatment agents such as surfactants and nanoparticle dispersions, however, may be introduced into a fracture to alter the wetting characteristics of the fracture environment to improve the desired permeability and recovery.

For non-porous, solid surfaces such as a formation surface, the wetting phase will spread across the surface. For porous, solid surfaces, such as porous ceramic proppant, the wetting phase may be absorbed by the surface. Pumping fluids containing nanoparticle dispersions or surfactants into a formation in liquid form may improve the wettability of a formation surface, but may not provide any significant or long-term improvement in the wetting characteristics of the proppant, and therefore would not offer the corresponding improvement in proppant conductivity that promotes hydrocarbon production, reservoir water production, or frac fluid clean up or production.

In the case of a horizontal well, as many as 40 separate hydraulic fracturing operations, or stages, may be conducted. It may sometimes be desirable to utilize unique tracers in each of these stages and further to determine the relative amounts of hydrocarbons and water production from each of the stages. In addition, one may wish to determine the relative fluid production from different portions of each of the 40 stages. It is also desirable for the tracers to be released over an extended period of time of perhaps months or years. In such a scenario, more than 100 unique tracers would be required. Further, to be cost effective the amount of each tracer required should ideally be limited. Tracers in the prior art are limited in number and could not accomplish this task. Additionally, many of the prior art tracers cannot preferentially partition into the hydrocarbon or water phases and detection limits are too high for long term identification especially when placed directly in the frac fluid.

Therefore, what is needed is a method to add porous chemically infused ceramic proppant to standard non-porous proppant in a manner that will not negatively impair proppant conductivity. Also, what is needed is a tracer carrier that does not segregate from the standard proppant when added in a hydraulic fracture and that does not negatively impact conductivity. Additionally, what is needed is a method of altering wettability of a proppant through the infusion of nanoparticle dispersions or surfactants into the porous proppant to increase fluid production.

Also, it would be beneficial to have a tracer technology that can provide a very large number of unique tracers that are capable of partitioning into either of the hydrocarbon or water phases as desired, are detectable at very low concentrations in the produced fluids for an extended period of time, and are not subject to degradation at the high temperatures and pressures often found in well formations.

Additionally, in many well operations, the release of the chemical treatment agent over an extended period of time is desirable. What is needed is a porous ceramic proppant infused with a chemical treatment agent and a method of introducing the proppant into a fracture such that the release of the chemical treatment agent into the fracture or well area can be controlled over an extended period of time. Also, what is needed is a semi-permeable coating for the proppant that is substantially non-degradable in the presence of the well fluids but permits diffusion of the chemical treatment agent through the semi-permeable coating so as to release the chemical treatment agent into the fracture or well area over an extended period of time.

BRIEF DESCRIPTION OF THE DRAWINGS

The present invention may best be understood by referring to the following description and accompanying drawings that are used to illustrate embodiments of the invention. In the drawings.

DETAILED DESCRIPTION

Figure 1:
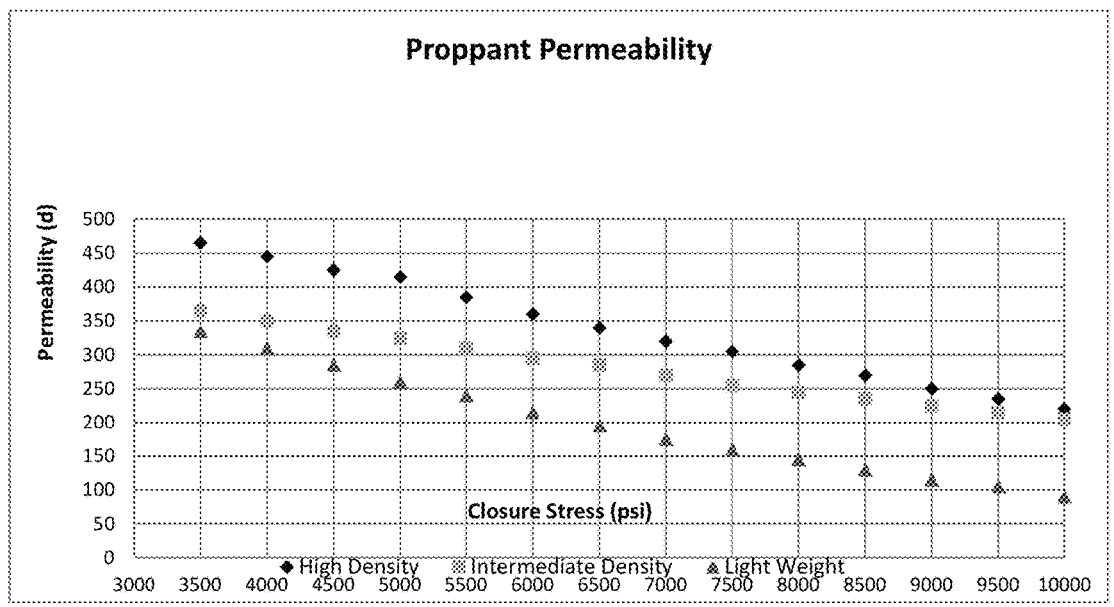
FIG. 1 is a graphical representation of a comparison of proppant permeability for lightweight ceramic proppant, intermediate density ceramic proppant, and high density ceramic proppant.

In the following description, numerous specific details are set forth. However, it is understood that embodiments of the invention may be practiced without these specific details. In other instances, well-known structures and techniques have not been shown or described in detail in order not to obscure the understanding of this description.

The term "apparent specific gravity," as used herein, is the weight per unit volume (grams per cubic centimeter) of the particles, including the internal porosity. The apparent specific gravity values given herein were determined by the Archimedes method of liquid (water) displacement according to API RP60, a method which is well known to those of ordinary skill in the art. For purposes of this disclosure, methods of testing the characteristics of the proppant in terms of apparent specific gravity are the standard API tests that are routinely performed on proppant samples.

The term "conductivity," as used herein, is defined as the product of the width of the created fracture and the permeability of the proppant that remains in the fracture.

The term "high density proppant," as used herein, means a proppant having an apparent specific gravity of greater than 3.4 $g/cm^3$.

The term "intermediate density proppant," as used herein, means a proppant having an apparent specific gravity of from about 3.1 to 3.4 $g/cm^3$.

The term "internal interconnected porosity," as used herein, is defined as a percentage of the pore volume, or void volume space, over the total volume of a porous ceramic particulate.

The term "light weight proppant," as used herein, means a proppant having an apparent specific gravity of less than 3.0 $g/cm^3$.

The term "degradable," as used herein, means the ability of a chemical or coating to react to dissolve or breakdown into smaller components under one or more downhole conditions.

According to certain embodiments of the present invention, a composite ceramic proppant composition for use in hydraulic fracturing is produced. According to certain embodiments of the present invention, the composite ceramic proppant comprises a non-porous particulate part and a porous ceramic particulate part, wherein the porous ceramic particulate is infused with a chemical treatment agent. Furthermore, according to certain embodiments of the present invention, the permeability and conductivity of the composite ceramic proppant composition is at least equal to the permeability and conductivity of the non-porous particulate part alone.

Ceramic proppants can be manufactured to a range of apparent specific gravity. For instance, U.S. Pat. No. 4,427,068, the entire disclosure of which is incorporated herein by reference, discloses a method for manufacturing proppant with an apparent specific gravity of less than 3.4 $g/cm^3$. The method comprises preparing proppant pellets from a clay mixture of at least 40% clay, and another material such as bauxite or alumina. The clay mixture comprises burley clay, flint clay and at least 60% diaspore clay. The raw materials are blended in a mixer and water is added until the composite forms spherical pellets. 5-15% of additional ceramic powder is then added to the pellets. The spherical pellets are then dried and furnaced at sintering temperature until they reach an apparent specific gravity between about 2.7 and 3.4 g/cm$^3$.

Also, U.S. Pat. No. 4,440,866, the entire disclosure of which is incorporated herein by reference, discloses a method for continuous process manufacture of proppant with an apparent specific gravity of approximately 3.7 g/cm$^3$. The method comprises 1) preparing an aqueous feed suspension of bauxite and a binder, 2) continuously atomizing the feed suspension into a layer of already partly dried bauxite particles fluidized in a stream of drying air, 3) continuously recovering particles from the layer, 4) continuously separating the particles into oversize, undersize, and product fractions, 5) continuously recycling unsuitable material, and 6) drying and sintering the non-recycled product by heating at a temperature of between about 1200 and 1650° C.

In addition, U.S. Pat. No. 4,522,731, the entire disclosure of which is incorporated herein by reference, refers to the method disclosed in U.S. Pat. No. 4,440,866 to manufacture proppant having an apparent specific gravity of less than 3.0 g/cm$^3$.

Moreover, U.S. Pat. No. 4,623,630, the entire disclosure of which is incorporated herein by reference, discloses a method for manufacturing proppant with an apparent specific gravity of between about 2.6 to 3.3 g/cm$^3$. The method comprises preparing proppant pellets from a mixture of dried but uncalcined or partially calcined clays and bauxites and dust collector fines with fully calcined materials. The raw materials are blended in a mixer and water is added until the composite forms spherical pellets. 5-15% of additional ceramic powder is then added to the pellets. The spherical pellets are then dried and furnaced at sintering temperature until they reach an apparent specific gravity between about 2.6 and 3.3 g/cm$^3$.

Further, U.S. Pat. No. 4,658,899, the entire disclosure of which is incorporated herein by reference, discloses a method for manufacturing proppant with an apparent specific gravity of between about 2.9 and 3.2 g/cm$^3$. The method comprises preparing proppant pellets from a mixture of 40-70% dried but uncalcined clay, and bauxites and dust collector fines with fully calcined materials. The raw materials are blended in a mixer and water is added until the composite forms spherical pellets. 5-15% of additional ceramic powder is then added to the pellets. The spherical pellets are then dried and furnaced at sintering temperature until they reach an apparent specific gravity between about 2.9 to 3.2 g/cm$^3$.

Still further, U.S. Pat. No. 7,036,591, the entire disclosure of which is incorporated herein by reference, discloses that ceramic proppants can be manufactured to a range of apparent specific gravity. The range of apparent specific gravities reflects the range of internal porosity present in the ceramic pellets.

According to certain embodiments of the present invention, the proppant composition has an apparent specific gravity of less than 3.1 g/cm$^3$, less than 3.0 g/cm$^3$, less than 2.8 g/cm$^3$, or less than 2.5 g/cm$^3$. In other embodiments, the proppant composition has an apparent specific gravity of from about 3.1 to 3.4 g/cm$^3$. In still other embodiments, the proppant composition has an apparent specific gravity of greater than 3.4 g/cm$^3$, greater than 3.6 g/cm$^3$, greater than 4.0 g/cm$^3$, or greater than 4.5 g/cm$^3$.

According to several exemplary embodiments, the proppant composition includes a non-porous proppant. Suitable materials for use as the non-porous particulate include lightweight non-porous ceramic proppant, intermediate density non-porous ceramic proppant and high density non-porous ceramic proppant.

According to several exemplary embodiments, the proppant composition includes a porous ceramic proppant. Suitable proppant materials for use as the porous ceramic proppant include lightweight porous ceramic proppant, intermediate density porous ceramic proppant and high density porous ceramic proppant. U.S. Pat. No. 7,036,591, the entire disclosure of which is incorporated herein by reference, is directed to a proppant having a range of apparent specific gravity.

Figure 2:
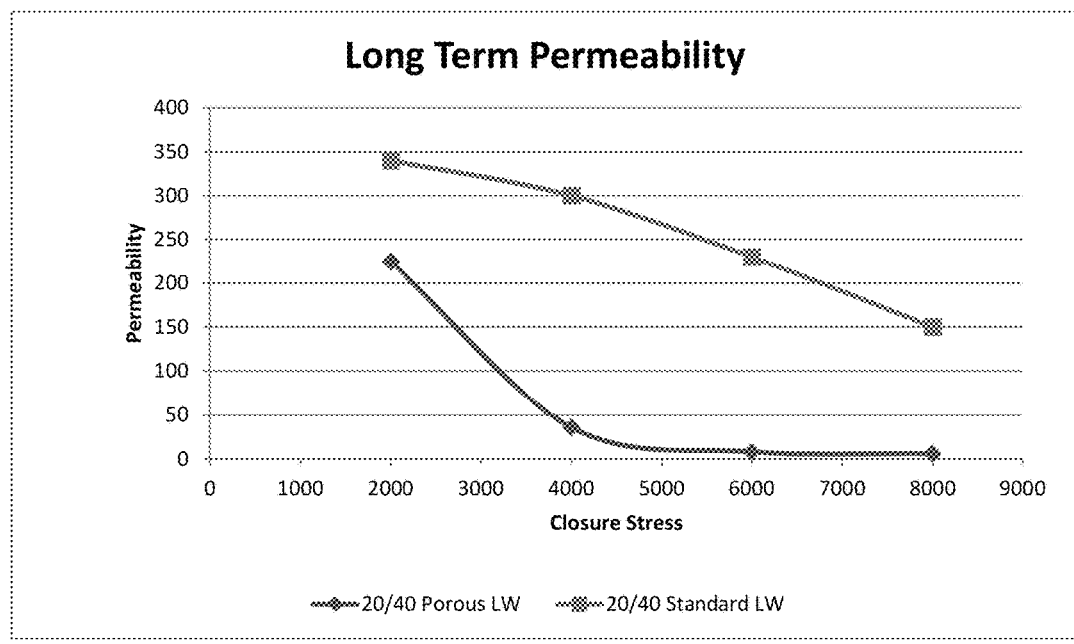
FIG. 2 is a graphical representation of the long term permeability of a standard non-porous light weight ceramic proppant and a light weight porous ceramic proppant (at 25% porosity).

FIG. 1 is a graphical comparison of the permeability of light weight ceramic proppant, intermediate density ceramic proppant, and high density ceramic proppant. As shown in FIG. 1, a high density ceramic proppant has a higher permeability than an intermediate density ceramic proppant which in turn has a higher permeability than a light weight ceramic proppant. This variability results from the crystalline structure differences arising from the difference in composition of the starting raw materials. FIG. 2 is a graphical representation of the long term permeability of a standard non-porous light weight ceramic proppant and a light weight porous ceramic proppant (at 25% porosity). Standard ceramic proppants are generally manufactured so as to eliminate as much porosity as is practically possible in the individual particulates in order to maximize the inherent strength of the particles. This is consistent with the nature of ceramic bodies in that they tend to fail as a function of the size of the largest internal flaw and in this context an internal open pore space is a flaw. Consequently, in a general sense, the lower the internal porosity with small pore sizes, the stronger the ceramic body. Conversely, in a general sense, the greater the overall amount of internal porosity and large pore size of a ceramic particulate the weaker will be its inherent strength. Thus, the conductivity of a light weight ceramic proppant in which there is 10% porosity in the particle will be lower than the conductivity of a lightweight ceramic proppant having 5% porosity which in turn will be lower than a non-porous light weight ceramic proppant.

Further, the comparison shown in FIG. 1 for non-porous ceramic particulates can be duplicated for porous ceramic particulates. Specifically, a high density porous ceramic proppant that has a porosity of the particulate of 12% will have a higher permeability than an intermediate density ceramic proppant with 12% particulate porosity, which in turn will have a higher permeability than a light weight ceramic proppant with 12% particulate porosity.

According to several exemplary embodiments of the present invention, the porous ceramic particulates are infused with one or more chemical treatment agents. Methods for infusing porous ceramic particulates with chemical treatment agents are well known to those of ordinary skill in the art, such as those disclosed in U.S. Pat. No. 5,964,291 and U.S. Pat. No. 7,598,209, the entire disclosures of which are incorporated herein by reference. According to several exemplary embodiments, the porous ceramic particulates act as a carrier for the chemical treatment agent in a hydraulic fracturing operation.

According to several exemplary embodiments of the present invention, in order to add porous, chemically infused ceramic proppant to standard non-porous ceramic proppant in a hydraulic fracture in a way that does not impair the permeability or conductivity of the standard non-porous ceramic proppant alone, requires the use of a combination of different types of ceramic proppants for the standard non-porous and porous portions of the total ceramic proppant mass utilized in the fracturing operation. For instance, according to several exemplary embodiments of the present invention, if the standard non-porous particulate selected is a light weight ceramic proppant, the porous ceramic particulate can be either an intermediate density ceramic proppant or a high density ceramic proppant. Also, according to several exemplary embodiments of the present invention, if the standard non-porous particulate selected is an intermediate density proppant, the porous ceramic particulate can be a high density ceramic proppant.

For example, the fraction of intermediate density porous ceramic proppant to be added to a standard non-porous light weight ceramic proppant will dictate the maximum porosity that the intermediate density porous ceramic may have and not negatively impact permeability. In this example, if a 10% fraction of intermediate density porous proppant is to be added to a standard light weight ceramic proppant then the maximum porosity of the intermediate density porous proppant may be 12% in order to not reduce the permeability of the proppant as compared to the permeability of the standard light weight ceramic proppant alone whereas adding a 10% fraction of an intermediate density porous proppant having 20% porosity may be detrimental to proppant permeability.

According to several exemplary embodiments of the present invention, the porous, chemically infused porous ceramic proppant may have a similar alumina content as the standard non-porous ceramic proppant and can be added to the standard non-porous ceramic proppant in a hydraulic fracture in a way that does not impair the permeability or conductivity of the standard non-porous ceramic proppant alone. According to such embodiments, the porous and non-porous proppants are processed in different ways such that the mechanical properties of the chemically infused porous ceramic proppant is approximately the same as or better that the mechanical properties of the standard non-porous ceramic proppant.

A ceramic proppant composition containing a mixture of porous ceramic proppant and non-porous ceramic proppant can have a conductivity that is at least about 10%, at least about 20%, at least about 30%, at least about 40%, at least about 50%, at least about 60%, at least about 70%, at least about 80%, at least about 90%, at least about 95%, or at least about 99% of the conductivity of the non-porous ceramic proppant. For example, the ceramic proppant composition containing a mixture of porous ceramic proppant and non-porous ceramic proppant can have a conductivity from about 25% to about 125%, about 55% to about 115%, about 65% to about 112%, about 75% to about 108%, about 85% to about 105%, about 95% to about 105%, or about 99.99% to about 102% of the conductivity of the non-porous ceramic proppant.

According to several exemplary embodiments, a method of diagnostic evaluation of a hydraulic fracturing operation is provided, the method comprising: 1) injecting a hydraulic fluid into the subterranean formation at a rate and pressure sufficient to open a fracture therein, and 2) injecting a proppant composition into the subterranean formation, wherein the proppant composition includes porous ceramic proppant infused with a chemical treatment agent, 3) wherein the chemical treatment agent separates from the porous ceramic proppant over an extended period of time, 4) wherein the chemical treatment agent returns to the surface with the produced fluids, and 5) wherein the chemical treatment agent is recovered and identified. According to several exemplary embodiments, the chemical treatment agent is a biological marker, or biological tag.

As noted above, ceramic proppants can be manufactured to a range of apparent specific gravities and such range of specific gravities reflects the range of internal porosity present in the ceramic pellets. Typically, the internal porosity of commercial ceramic proppant is low (generally less than 5% and this internal porosity is not interconnected). As disclosed in U.S. Pat. No. 7,036,591, however, the processing of ceramic proppants can be altered to generate within the individual ceramic pellet a porosity exceeding 30%. As pellet porosity exceeds about 5%, the porosity of the pellet becomes interconnected. According to several exemplary embodiments, the internal interconnected porosity in the porous ceramic proppant can be infused with a chemical treatment agent. Methods for infusing a porous ceramic proppants are well known to those of ordinary skill in the art, for instance see U.S. Pat. No. 5,964,291 and U.S. Pat. No. 7,598,209, and similar processes such as vacuum infusion, thermal infusion, capillary action, ribbon blending at room or elevated temperature, microwave blending or pug mill processing can be utilized to infuse porous ceramic proppants with chemical treatment agents according to several exemplary embodiments of the present invention. Specifically, according to several exemplary embodiments, chemical treatment agents include tracers, scale inhibitors, hydrate inhibitors, hydrogen sulfide scavenging materials, corrosion inhibitors, paraffin or wax inhibitors, including ethylene vinyl acetate copolymers, asphaltene inhibitors, organic deposition inhibitors, biocides, demulsifiers, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, nanoparticle dispersions, surfactants, combinations thereof, or any other oilfield chemical that may be deemed helpful in the hydraulic fracturing process.

As noted above, the internal porosity in porous ceramic pellets can be infused with a chemical treatment agent such as a tracer material so that the porous ceramic pellets act as a carrier for the tracer in a hydraulic fracturing operation. By tailoring the type of porous ceramic pellets used as a carrier, according to the methods discussed above, any potential impact to proppant conductivity by using the porous ceramic pellets can be avoided. According to certain embodiments of the present invention, the tracer material includes metallic or non-metallic nano-particles while in other embodiments, the tracer material includes a chemical tracer.

According to several exemplary embodiments, chemical tracer materials, such as the biological tags described in International Patent Publication No. WO2007/132137, are infused into porous ceramic particulates. Generally, materials that may be used as chemical tracers include various dyes, fluorescent materials, as well as biological markers, such as DNA. Other chemical tracers include fluorine substituted compounds. According to several exemplary embodiments, in order to ensure the tracer is reliably carried to the surface in produced fluid, the tracer is soluble in the produced fluid. The produced fluid may be water or hydrocarbon and there are available tracers that are only soluble in water or only soluble in liquid hydrocarbon or only soluble in hydrocarbon gases. This variable solubility allows for more definitive diagnostic capabilities. For example hydraulic fracturing is often performed in stages. That is, the entire hydrocarbon bearing interval to be hydraulically fractured is not stimulated at one time but rather in stages. In the case of a horizontal well, as many as forty separate hydraulic fracturing operations, or stages, may be conducted in the horizontal section. Because each stage of hydraulic fracturing entails additional cost, it is of interest to determine how many of the stages are contributing to production from the well and further which contributing stages are producing hydrocarbons and which are producing water. The use of distinctive tracer materials can accomplish this objective. For example, if a well is hydraulically fractured in five stages and it is of diagnostic importance to determine which of the stages are producing liquid hydrocarbons and which of the stages are producing water, then there may be introduced into the proppant for stage 1 a fraction of a porous ceramic proppant that has a unique liquid hydrocarbon-soluble Tracer 1H infused into the pores of the ceramic pellets thereof. Also, there may be added to this stage, a fraction of the proppant that is a porous ceramic and has infused into the pores of the ceramic pellet a unique water-soluble Tracer 1W. For the second stage of the hydraulic fracturing operation, then there may be introduced into the proppant for stage 2 a fraction of a porous ceramic proppant that has a unique liquid hydrocarbon soluble Tracer 2H infused into the pores of the ceramic pellets thereof. Also, there may be added to this stage a fraction of the proppant that is a porous ceramic and has infused into the pores of the ceramic pellet a unique water-soluble Tracer 2W. This method of adding uniquely distinguishable hydrocarbon-soluble and water-soluble tracers in the porous ceramic may continue for all or a portion of the subsequent stages. When the well is then placed on production following the completion of the hydraulic fracturing operations, samples of the produced water and hydrocarbons are then captured at different points in time following the start of production and analyzed for the presence of the unique tracer materials. By determining the presence and relative concentration of each of the tracer materials, diagnostic determinations can be made of effectiveness of the stimulation and the hydrocarbon content of the stimulated formation. This diagnostic information can then be utilized to optimize subsequent hydraulic fracturing operations in nearby wells.

According to several exemplary embodiments, a composite ceramic proppant composition for use in hydraulic fracturing is produced. According to several exemplary embodiments, the composite ceramic proppant composition includes porous ceramic particulates infused with a chemical treatment agent. Furthermore, according to several exemplary embodiments, the infused porous ceramic particulates are encapsulated with a coating. The coating can be or include one or more organic or inorganic materials. For example, the coating can be or include a polymeric material. According to several exemplary embodiments, the porous ceramic particulates are infused with a water-soluble chemical treatment agent such as a scale inhibitor, a salt inhibitor, or combinations or mixtures thereof, and are then coated with a hydrocarbon-soluble chemical treatment agent such as a paraffin inhibitor. According to such embodiments, the infused coated porous ceramic proppant is placed in a fracture in a subterranean formation and once hydrocarbon production begins, the presence of the hydrocarbons causes leaching, elution, diffusion, bleeding, discharging, desorbing, dissolving, draining, seeping, or leaking of the hydrocarbon-soluble chemical treatment agent from the proppant. After a certain period of time, when water production begins, then the infused water-soluble chemical treatment agent begins to leach, elute, diffuse, bleed, discharge, desorb, dissolve, drain, seep, or leak from the proppant.

According to several exemplary embodiments, the porous ceramic particulates infused with a chemical treatment agent are coated with a polymeric material that forms a semi-permeable polymeric coating that is substantially non-degradable in the presence of the well fluids but permits the chemical treatment agent to leach, elute, diffuse, bleed, discharge, desorb, dissolve, drain, seep, and leak through the polymeric coating so as to release the chemical treatment agent into the fracture or well area. The amount and molecular weight of the semi-permeable substantially non-degradable polymeric coating can be varied to provide for longer or shorter release times for tailored release of the chemical treatment agents.

According to several exemplary embodiments, the chemical treatment agent is released from the porous ceramic particulates for a period of up to about one year, up to about five years, or up to about ten years after the porous ceramic particulates are placed in a fracture in a subterranean formation.

According to several exemplary embodiments, the porous ceramic particulates are coated with a semi-permeable substantially non-degradable polymer such as phenol formaldehyde, polyurethane, cellulose ester, polyamides, vinyl esters, epoxies, or combinations thereof.

According to several exemplary embodiments of the present invention, the proppant pellets which are infused with a chemical treatment agent further include a degradable coating. Specifically, as the coating degrades, the chemical treatment agent infused in the proppant pellets will be released into the fracture. The amount and molecular weight of the degradable coating can be varied to provide for longer or shorter degrade times and tailored release of the chemical treatment agent.

According to certain embodiments, the degradable coating may include one or more of water-soluble polymers and cross-linkable water-soluble polymers. Suitable water-soluble polymers and cross-linkable water-soluble polymers are disclosed in U.S. Pat. No. 6,279,656, the entire disclosure of which is incorporated herein by reference. According to several exemplary embodiments in which the degradable coating includes one or more of water-soluble polymers and cross-linkable water-soluble polymers, the solubility parameters of such polymers may be controlled to adjust the timing of the solubility or degradation of the coating. Such parameters may include molecular weight, the hydrophilic/lipophilic balance of the polymers, and the extent of cross-linking of the polymers. According to several exemplary embodiments, the degradable coating includes a degradable polymer such as polylactic acid, cellulose acetate, methyl cellulose or combinations thereof and will degrade inside the hydraulic fracture to allow for the release of the infused chemical treatment agent at different time intervals.

Also as noted above, the internal porosity in porous ceramic pellets can be infused with a chemical treatment agent such as a nanoparticle dispersion so that the porous ceramic pellets act as a carrier for the nanoparticle dispersion in a hydraulic fracturing operation. The infusion of the nanoparticle dispersion into the internal porosity of the porous ceramic proppant, rather than simply injecting or pumping the nanoparticle dispersion into a well formation in fluid form, improves not only the wetting characteristics of the formation surfaces but also of the proppant itself. The nanoparticle dispersion interacts with the surface of the proppant to alter its wetting characteristics. Further, as fluids flow through the proppant pack in the formation, some of the nanoparticle dispersion may be released into the fracture and adhere to and improve the wettability of the formation surfaces. Thus, the use of nanoparticle dispersions that are infused into proppant offers benefits similar to those obtained by pumping the nanoparticle dispersion into the formation in fluid form, but the increased interaction of the nanoparticle dispersion with the proppant offers the additional benefit of improved wettability of the proppant.

Similarly, the internal porosity in porous ceramic pellets can be infused with a chemical treatment agent such as a surfactant so that the porous ceramic pellets act as a carrier for the surfactant in a hydraulic fracturing operation. The use of a surfactant that is infused into the proppant itself, rather than simply pumped into a formation, also offers improved wetting characteristics of the proppant similar to those described in conjunction with nanoparticle dispersions.

Nanoparticle dispersions may include a number of different nanoparticle materials known to those of ordinary skill in the art, including polymers, silica, metals, metal oxides, and other inorganic materials, that are suspended in an aqueous or non-aqueous solvent fluid. According to several exemplary embodiments, suitable materials include but are not limited to nanoparticles such as silicon dioxide, zirconium dioxide, antimony dioxide, zinc oxide, titanium dioxide, aluminum dioxide, particles derived from natural minerals, synthetic particles, and combinations thereof. According to several exemplary embodiments, one or more of silicon dioxide, zirconium dioxide and antimony dioxide are added at about 65 nanometers or less in diameter (in several exemplary embodiments 1-10 nm) and have a polydispersity of less than about 20%.

The selection of a specific nanoparticle dispersion or surfactant to be infused into the porous ceramic proppant depends on the necessary adjustment in wetting characteristics of the proppant for the desired production enhancement. Surfactants may be any selected from any number of surfactants known to those of ordinary skill in the art, including, for example, anionic, cationic, nonionic, and amphoteric surfactants, or combinations thereof. According to several exemplary embodiments, suitable surfactants include but are not limited to saturated or unsaturated long-chain fatty acids or acid salts, long-chain alcohols, polyalcohols, dimethylpolysiloxane and polyethylhydrosiloxane. According to several exemplary embodiments, suitable surfactants include but are not limited to linear and branched carboxylic acids and acid salts having from about 4 to about 30 carbon atoms, linear and branched alkyl sulfonic acids and acid salts having from about 4 to about 30 carbon atoms, linear alkyl benzene sulfonate wherein the linear alkyl chain includes from about 4 to about 30 carbon atoms, sulfosuccinates, phosphates, phosphonates, phospholipids, ethoxylated compounds, carboxylates, sulfonates and sulfates, polyglycol ethers, amines, salts of acrylic acid, pyrophosphate and mixtures thereof. According to several exemplary embodiments, suitable surfactants include but are not limited to sodium stearate, octadecanoic acid, hexadecyl sulfonate, lauryl sulfate, sodium oleate, ethoxylated nonyl phenol, sodium dodecyl sulfate, sodium dodecylbenzene sulfonate, laurylamine hydrochloride, trimethyl dodecylammonium chloride, cetyl trimethyl ammonium chloride, polyoxyethylene alcohol, alkylphenolethoxylate, Polysorbate 80, propylene oxide modified polydimethylsiloxane, dodecyl betaine, lauramidopropyl betaine, cocamido-2-hydroxy-propyl sulfobetaine, alkyl aryl sulfonate, fluorosurfactants and perfluoropolymers and terpolymers, castor bean adducts and combinations thereof. According to several exemplary embodiments, the surfactant is sodium dodecylbenzene sulfonate or sodium dodecyl sulfate. According to several exemplary embodiments, the surfactants are used at a concentration below the critical micelle concentration (CMC) in aqueous and hydrocarbon carrier fluids.

Suitable nanoparticle dispersions or surfactants may be selected from any number of commercially available products. For example, nanoparticle dispersion products are commercially available from FTS International® as NPD 2000® and NPD 3000®. Nanoparticle dispersions are also commercially available from CESI Chemical, Inc., a subsidiary of Flotek Industries, Inc., as MA-844W, MA-845, StimOil® FBA M, StimOil® FBA Plus, and StimOil® FBA Plus Enviro. Further, surfactants as production enhancement additives are commercially available from CESI Chemical, Inc., as SG-400N, SG-401N, and LST-36.

According to several exemplary embodiments of the present invention which include a degradable coating on the proppant pellets, the chemical treatment agent includes metallic or non-metallic nanoparticles which are added to the pore space of the porous proppant pellets and are released when the degradable coating dissolves in aqueous or hydrocarbon fluids. According to such embodiments, the nanoparticles flow to the surface with the fluid and can be analyzed (chemically or otherwise) for their presence.

According to several exemplary embodiments of the present invention which include a degradable coating on the proppant pellets, the chemical treatment agent infused into the proppant pellets includes nanoparticle dispersions or surfactants which are added to the pore space of the porous proppant pellets and are released when the degradable coating dissolves in aqueous or hydrocarbon fluids. According to such embodiments, upon degradation of the coating, some of the nanoparticle dispersions or surfactants are released upon exposure to passing fluids, and therefore improve the wettability of formation surfaces. The portion of the nanoparticle dispersions or surfactants remaining in the proppant would improve the wettability of the proppant itself. According to several exemplary embodiments of the present invention, the degradable coating would degrade inside the hydraulic fracture over a desired period of time, thereby allowing for timed release of the chemical treatment agent and a longer effective life.

In an exemplary method of fracturing a subterranean formation, a hydraulic fluid is injected into the formation at a rate and pressure sufficient to open a fracture therein, and a fluid containing a proppant composition comprising a non-porous particulate and a porous ceramic particulate infused with a chemical treatment agent, as described herein and having one or more of the properties as described herein is injected into the fracture to prop the fracture in an open condition.

In several exemplary embodiments of the present invention, the internal interconnected porosity of the porous ceramic proppant is in a range from about 5-35%, or alternatively in a range from about 5-15%, or 15-35%. As noted above, the internal interconnected porosity in porous ceramic proppant can be infused with a chemical treatment agent such as a biological marker so that the porous ceramic proppant acts as a carrier for the biological marker in a hydraulic fracturing operation. According to several exemplary embodiments, the biological marker is DNA. DNA, or deoxyribose nucleic acid, is sometimes a double-stranded helical molecule that encodes the genetic information of almost all living systems. Each DNA molecule can be unique as a result of a particular sequence of nitrogenous bases—adenine ("A"), thymine ("T"), cytosine ("C") and guanine ("G")—contained with the molecule. The double helix structure is formed and maintained by the pairing of a nitrogenous base on one phosphate/sugar backbone carrier chain with a nitrogenous base on the other phosphate/sugar backbone carrier chain through hydrogen bonding. Specifically, an adenine base will pair with a thymine base (an "AT" base pair), and a cytosine base will pair with a guanine base (a "GC" base pair). Probability terms can be calculated for the frequency of a given sequence of bases, and as long as a large enough DNA molecule is used, the "uniqueness" of a particular molecule of DNA can be known with sufficient certainty. The DNA molecule may be naturally occurring or a manufactured (synthetic) DNA and can be double stranded or single stranded. Synthetic DNA is commercially available and may be manufactured to order by several specialized DNA manufacturers, such as GenScript, Synthetic Genomics, DNA 2.0, Genewiz, Inc., Life Technologies, and Cambrian Genomics. Further, the DNA can be "encapsulated" to enhance its survivability at downhole reservoir conditions and to otherwise alter its interaction with formation fluids. Additionally, specific DNA sequences may be selected for use based on compatibility with the thermal environment of a specific well.

Infusing the biological marker into the porous ceramic proppant rather than adding the biological marker directly to the fracture fluids permits a long term diagnostic capability not otherwise available. When the marker is added directly to the fracture fluid it will flow back immediately with the fluid when the well is placed on production because there is no mechanism for the marker to remain in the well. Thus, the diagnostic benefits of adding the marker directly to the fracture fluid are limited. Conversely, when the biological marker is infused into a porous ceramic proppant, the elution of the marker is slow and can be controlled by one or both of the characteristics of the porosity of the proppant grain or by the addition of a permeable coating on the porous proppant after infusion to further delay the release of the biological marker. When so infused into a porous ceramic proppant, the marker can provide a tool for the long term diagnostic evaluation of well performance.

In order for the biological marker to be reliably carried to the surface in produced fluid, the biological marker must be capable of eluting from the porous proppant grain and partitioning into the produced fluid which may be a water-based or hydrocarbon-based fluid. According to several exemplary embodiments, the biological marker can be encapsulated to preferentially partition into either or both water and hydrocarbon phases, depending on the diagnostic goals. This variable partitioning allows for more definitive diagnostic capabilities. For example, as mentioned above, hydraulic fracturing is often performed in stages. That is, the entire hydrocarbon bearing interval to be hydraulically fractured is not stimulated at one time but rather in stages. In the case of a horizontal well as many as 40 separate hydraulic fracturing operations may be conducted in the horizontal well. Because each stage of hydraulic fracturing entails additional cost, it is of interest to determine how many of the stages are contributing to production from the well and further which contributing stages are producing hydrocarbons and which are producing water.

According to several exemplary embodiments, a biological marker can be used to accomplish this objective. For example, according to several exemplary embodiments, if a well is hydraulically fractured in five stages and it is of diagnostic importance to determine which of the stages are producing hydrocarbons and which of the stages are producing water, then there may be infused into the pores of the porous ceramic proppant for the first stage an unique hydrocarbon-partitioning biological marker, such as an encapsulated synthetic DNA with a known sequence. Also, there may be added to the first stage a porous ceramic proppant infused with a unique water-partitioning biological marker. For the second stage of the hydraulic fracturing operation, then there may be infused into the pores of the porous ceramic proppant a different unique hydrocarbon-partitioning biological marker. Also, there may be added to the second stage a porous ceramic proppant infused with a different, unique water-partitioning biological marker. According to several exemplary embodiments, this method of infusing different uniquely distinguishable hydrocarbon- and water-partitioning biological markers in the porous ceramic proppants may continue for all or a portion of the subsequent stages. In addition to determining which stages of a hydraulically fractured well are producing hydrocarbons and/or water it may be desirable to determine the fraction of the created fracture that is contributing to the flow of fluids. Estimates of the length and heights of the created fracture are possible by various means well known to those of ordinary skill in the art. Fracture lengths of several hundred feet and heights of 50 feet or more are common. Further it is also well established that the entire length and height of the created fracture may not contribute to production from the well. This lack of contribution can be determined by a number of methods well known to those of ordinary skill in the art. To the extent the entire fracture does not contribute to flow, the cost to create the non-contributing portion is wasted or conversely failure of a portion of the fracture to contribute may result in a reduction of produced hydrocarbons from the well. Thus, it is valuable to assess the fraction of the created fracture contributing to flow. Such knowledge can lead to optimization of the design of subsequent hydraulic fracturing operations. This can be accomplished by incorporating a porous ceramic proppant infused with a unique water and/or hydrocarbon partitioning biological marker within a segment of the proppant being pumped in a particular stage and then incorporating a porous ceramic proppant infused with a different unique water and/or hydrocarbon partitioning biological marker within a second a segment of the proppant being pumped in the same stage. This method can be replicated for as many segments of the stage one desires to interrogate. In the case of a 40 stage hydraulic fracturing operation where it is desirable to determine the contribution of both hydrocarbons and water from each stage as well as the hydrocarbon and water contribution from 5 segments of each stage, then 400 unique biological markers are required.

According to several exemplary embodiments, when the well is placed on production following the completion of the hydraulic fracturing operations, the infused biological marker will elute from the porous ceramic grains and will partition into one or both of the produced hydrocarbons and water. Samples of the produced water and hydrocarbons are then captured at different points in time and analyzed for the presence of the unique biological markers. By identifying the presence and relative concentration of each of the biological markers, diagnostic determinations can be made of the effectiveness of the stimulation and the hydrocarbon or water productivity of the stimulated formation. This diagnostic information can then be utilized to optimize subsequent hydraulic fracturing operations in nearby wells.

In order to accomplish this, and according to several exemplary embodiments, the biological marker separates from the porous ceramic proppant after the porous ceramic proppant is injected into the fracture. In several exemplary embodiments, separation of the biological marker from the porous ceramic proppant can be accomplished by the biological marker leaching, eluting, diffusing, bleeding, discharging, draining, seeping, or leaking out of the porous ceramic proppant, or any combination thereof. Further, this leaching, eluting, diffusing, bleeding, discharging, draining, seeping, or leaking out of the porous ceramic proppant, or any combination thereof can be further controlled by a permeable coating.

As mentioned above, the partitioning of the biological marker, i.e., whether into the hydrocarbon or water phase, can be tailored based on the needs of the fracturing operation by tailoring the encapsulation material. If, for example, diagnostic information is needed about a hydrocarbon-producing section of the well, a porous ceramic proppant can be infused with an encapsulated hydrocarbon-partitioning biological marker, which will then separate from the porous ceramic proppant into the surrounding hydrocarbon fluids. Conversely, if diagnostic information is needed about a water-producing section of the well, a porous ceramic proppant can be infused with an encapsulated water-partitioning biological marker, which will then separate from the porous ceramic proppant into the water.

As mentioned above, DNA alone can be used as the biological marker. DNA is typically water-soluble and can be infused into a porous ceramic proppant without any modification in order to function as a water-soluble biological marker. According to several exemplary embodiments, the DNA can be formulated in such a way that it is hydrocarbon-soluble and will separate into hydrocarbon fluids as well. For example, the water-solubility of DNA is due to the negative charges associated with the phosphodiester groups of the DNA. The negative charges of the phosphodiester structures can be removed by methylation. Methylation of this region of the DNA molecule will ensure that this part of the molecule becomes hydrophobic, i.e., hydrocarbon-soluble, thereby ensuring that the DNA molecule is soluble in the hydrocarbon phase. Other procedures for formulating hydrocarbon-soluble DNA can be found in U.S. Pat. No. 5,665,538, the entire disclosure of which is herein incorporated by reference.

While DNA itself may be used as a biological marker, the reservoir conditions in which the DNA is placed may not be optimal for the long term survivability of the DNA. These conditions include reservoir temperatures exceeding 200° F. and sometimes up to 400° F., as well as highly saline formation waters. However, numerous DNA encapsulation techniques are well known to those of ordinary skill in the art and by encapsulating the DNA, its survivability in harsh conditions is greatly enhanced. The partitioning of the DNA, whether into the hydrocarbon or water phase, can be tailored by tailoring the encapsulation material.

Additionally, molecules containing specific nucleotide sequences may be selectively used to enhance compatibility with the harsh wellbore and formation temperatures and pressures based on the improved thermal stability displayed by DNA molecules having higher concentrations of certain base pairs. Specifically, the DNA molecules having the greatest thermal resistance are those which include higher levels of GC base pairs and lower levels of AT base pairs. For example, the sequence GCAT (with corresponding base pair sequence CGTA) shows thermal stability at temperatures of from about 186 to 221° F. The sequence GCGC (with corresponding base pair sequence CGCG) is thermally resistant at temperatures of up to about 269 to 292° F. Conversely, the inclusion of higher levels of AT base pairs reduces thermal stability. For example, some thymine in the combination reduces the stability such that the sequence ATCG (with corresponding base pair sequence TAGC) only survives at temperatures of up to about 222 to 250° F., while the sequence TATA (with corresponding base pair sequence ATAT) is thermally stable at temperatures of up to only about 129 to 175° F. In addition, if the DNA molecules that include the sequence ATCG (with corresponding base pair sequence TAGC) are manipulated to include a modification known as G-clamp, the thermal stability increases by an additional 32° F. or from temperatures of up to about 254 to 282° F. As shown below, the G-clamp modification involves adding a tricyclic analogue of cytosine giving the duplex base pair (G-C) an additional hydrogen bond.

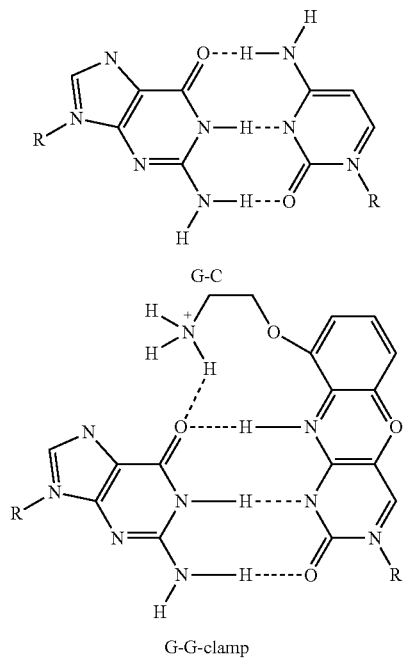

G-C

G-G-clamp

By increasing the hydrogen bonding of the duplex base pair from 3 to 4, the thermal stability increases by an additional 32° F.

The DNA can be either single stranded or double stranded. The natural orientation of DNA in the double stranded version is the Watson-Crick pairing. Synthetic DNA, however, is not constrained in the same way as natural DNA. Still, the indicator of thermal stability is a thermodynamic reorientation of the strands and consists primarily of the strands separating into two single strands. This is known as melting and happens over a narrow temperature range. What has been observed is that the DNA of some organisms resists this thermal collapse, examples being certain thermophilic organisms. Analysis of their genomes gives a direct correlation between the levels of G-C DNA in the sequences. Essentially, thermal stability is directly related to the number of hydrogen bonds between the bases in the duplex pairs. However, the stacking (pairing in the double strands) is also a factor. It has been determined that an important feature of thermal stability in natural DNA relies heavily upon the molar ratio of G-C pairing since this gives the highest density of hydrogen bonds. Thermal stability ultimately depends upon the so-called melting point where the strands of a double stranded DNA separate. This has no significance to single stranded synthetic DNA, however, which is already separated. The separation of the strands of double stranded DNA which occurs at the melting point is to some extent reversible. The strands can re-join once the temperature drops sufficiently. The thermal stability depends upon the thermal resistance of the base pairs or duplex units as well as the stacking forces which join the strands of double stranded DNA. As noted above, thermal stability can also be improved by modifying the molecular arrangement within a particular base pair. For instance, in addition to the G-G-Clamp modification noted above, the thermal stability of an A-T base pair can be improved, as shown below, by modifying the adenine-thymine base pair to include a 2-aminoadenine-T complex which increases the hydrogen bonding in the complex from 2 to 3 and increases its thermal stability by about 5° F.

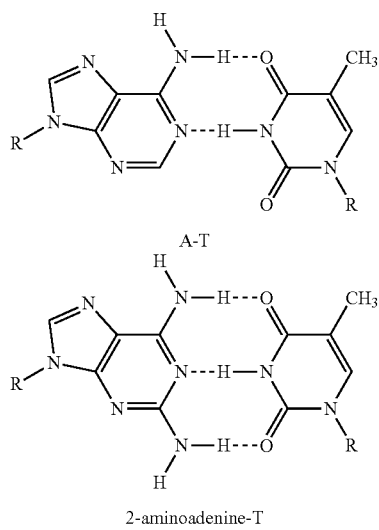

The thermal stability of specific base pairs can be used to generate a thermodynamic assessment of potential. As noted above, reasonable chemical modifications can extend this thermal range and retain the essential features of DNA for the purposes of measurement. The chemical nature of DNA means that it is susceptible to hydrolysis and the rate of hydrolysis increases with increasing temperature. Hydrolysis is another route for the decomposition of DNA in addition to decomposition due to its melting behavior as discussed above. That said, it is known that a number of organisms survive extremes of temperature which means that their genetic material must have some inherent thermal stability. This response has been directly correlated to the molar fraction of G-C base pairs irrespective of whether such base pairs are present as single or double strands. Natural DNA, however, is chromosomal and so must be double stranded.

Also it has been shown that the repetition of the G-C duplex appears to impart more stability since it has a direct effect upon the thermal resistance of the DNA. This shows how various organisms cope with high temperature by incorporating a larger G-C molar fraction into their genome. It appears that the molar fraction of G-C is the key rather than any weak link, which might be incorporated into the sequence. Chain terminators appear to have little overall effect on the thermal stability of the DNA. Essentially, what this means is that the molar fraction of certain base pairs in the DNA sequence can be varied according to the temperature range required. Getting down to the detail of destruction reactions for the DNA sequence will depend upon the environment to which a particular DNA sequence will be subjected and the exposure to hydrolysis reactions are an area of concern. However the modifications of the base pairs discussed above which can be introduced while still retaining the inherent features which make DNA an ideal tracer offer clear routes for tailor-made tracers for oilfield use.

Selectively using a specific DNA molecule as a biological marker based on its thermal stability properties allows for the use of DNA as a biological marker over a far wider range of conditions than is currently possible. Further, the survival of the DNA molecules at higher temperatures allows for accurate detection even with very low levels of DNA present in the formation by avoiding degradation of the DNA. Additionally, the diverse number of unique DNA molecules vastly adds to the number of unique tracers which can be applied in the oilfield, thereby greatly increasing both the range and diversity of oilfield operations to which biological markers can be applied and greatly improving the knowledge and understanding of increasingly complex wells and their behavior. This knowledge will lead to better completion and stimulation practices resulting in cost savings and improved well performance.

In several exemplary embodiments, a DNA molecule exhibiting specific thermostability properties, based on its specific nitrogenous base composition that are compatible with the thermal environment of a specific well, may be selectively infused into a porous proppant to be used in the well operations according to the methods and embodiments described herein. For example, for wells exhibiting temperatures of up to about 269 to 292° F., a DNA molecule containing the GCGC sequence could be synthesized and infused into the proppant to be injected into the well formation. This DNA molecule would better withstand the thermal conditions of the well, thereby allowing it to be more effectively used as a biological marker that conveys information regarding well formation and production.

According to several exemplary embodiments, the chemical treatment agent, such as a biological marker separates from the porous ceramic proppant continuously over a period of up to about one year, up to about five years, or up to about ten years after placement of the proppant in the hydraulically created fracture. Systems, techniques and compositions for providing for the sustained release of DNA are well known to those of ordinary skill in the art. For example, European Patent No. 1,510,224, the entire disclosure of which is incorporated herein by reference, discloses several methods for enabling the sustained release of DNA over a period of time. According to several exemplary embodiments, DNA is encapsulated with a polymer or a material infused with DNA is coated with a permeable nondegradeable coating. In several exemplary embodiments, the encapsulating polymer includes one or more of high melting acrylate-, methacrylate- or styrene-based polymers, block copolymers of polylactic-polyglycolic acid, polyglycolics, polylactides, polylactic acid, gelatin, water-soluble polymers, cross-linkable water-soluble polymers, lipids, gels, silicas, or other suitable encapsulating materials. Additionally, the encapsulating polymer may include an encapsulating material that comprises a linear polymer containing degradable co-monomers or a cross-linked polymer containing degradable cross-linkers.

According to several exemplary embodiments, after the chemical treatment agent, such as a biological marker separates from the porous ceramic proppant and partitions into a production fluid, the production fluid will then transport the biological marker to the surface. Once the production fluids reach the surface, the fluids can be analyzed for the presence of the biological marker.

According to several exemplary embodiments, the chemical treatment includes one or more biological markers having unique identifiers and the unique identifier of the one or more biological markers is logged before the one or more markers is injected into the fracture. In several exemplary embodiments when multiple biological markers are used across one or all of the stages of a fracture, this log will enable the well operator to match the biological marker in the production fluid to the section of the fracture where it was produced. For example, if three unique DNA markers are injected into stages 1, 2, and 3, respectively, of a hydraulic fracturing stimulation operation, the unique identifying base sequence of each DNA marker injected into stages 1, 2, and 3 will be recorded. If DNA is detected in the production fluids at the surface, the sequence of the returned DNA can be compared to the log to determine which stage produced the DNA. Relative amounts of each marker can be used to quantitatively estimate the relative volumes of the produced fluids from each of the stages. Identification and detection of DNA sequences is well known in the art and many companies manufacture "off-the-shelf" identification and detection assays. For example, DNA detection and identification assays and kits are available commercially from Molecular Devices, LLC and Illumina, Inc. Further, DNA replication methodologies are well known to those of ordinary skill in the art. This permits extremely low levels of DNA present in the produced fluids, which may be below detection limits, to be identified by first employing a replication procedure to increase the concentration of the DNA beyond detection limits. Because the replication methods proportionally increase all DNA present, the relative amount of the individual DNA markers present is not altered.

According to several exemplary embodiments, once the biological markers are recovered from the production fluids and identified, a comparative analysis of the amount of biological marker from each stage or stage segment in the sample can then be related to the amount of hydrocarbon or water produced from that section. For example, the relative hydrocarbon or water volume contribution of a stage or stages of the formation can be estimated based on the amount of biological markers recovered, i.e. with more hydrocarbon or water produced from that stage resulting in more biological detection from that stage. Additionally, the relative hydrocarbon or water volume contribution of a segment of a stage can be estimated based on the amount of biological markers recovered from the segment of the stage. Based on this analysis, a diagnostic log across multiple stages of a fractured formation can be developed, giving a well operator detailed knowledge about the production volume (or lack thereof) of the entire fractured formation. This analysis can likewise be repeated periodically over an extended timeframe to establish trends in the production performance of the well providing diagnostic information that is not now available with existing technologies.

In another aspect of the invention, an exemplary composition is provided. The composition includes a porous ceramic proppant infused with a chemical treatment agent, such as a biological marker, as described herein.

According to several exemplary embodiments, the chemically infused coated porous ceramic proppant is prepared according to a two-step process. In the first step, a chemical treatment agent is infused into the porous ceramic particulates. In the second step, the infused porous ceramic particulates are coated with a semi-permeable substantially non-degradable polymer. In several exemplary embodiments, the chemical treatment agent is infused into the porous ceramic particulates by vacuum infusion. In other exemplary embodiments, the chemical treatment agent is infused into the porous ceramic particulates using a thermal infusion process whereby the porous ceramic particulates are heated and wetted with a solution containing the chemical treatment agent. As the porous ceramic particulates cool, capillary action causes the chemical treatment agent to infuse into the porous ceramic particulates.

According to several exemplary embodiments, the chemically infused coated porous ceramic proppant is prepared according to a one step process. According to the one step process, the porous ceramic particulates are infused with a chemical treatment agent using the thermal infusion process described above and coated with a semi-permeable substantially non-degradable polymer before the resultant heat from the thermal infusion process dissipates.

According to several exemplary embodiments, a composite ceramic proppant composition for use in hydraulic fracturing is produced. According to several exemplary embodiments, the composite ceramic proppant composition includes porous ceramic particulates infused with a chemical treatment agent without the use of a solvent. Furthermore, according to several exemplary embodiments, the infused porous ceramic particulates are coated with a semi-permeable substantially non-degradable polymer.

According to several exemplary embodiments, suitable proppant materials for use as the porous ceramic particulates, suitable chemical treatment agents, and suitable polymer coatings include those listed above.

According to several exemplary embodiments, the chemical treatment agent is infused into the porous ceramic particulates without the use of a solvent by melting, thawing, heating, softening, or warming the chemical treatment agent to a sufficiently low viscosity to allow infusion into the porous ceramic particulates. In several exemplary embodiments, a sufficiently low viscosity to allow infusion into the porous ceramic particulate is from about 1000-10,000 centipoise (cps), from about 1000-5,000 cps, or from about 1000-2500 cps.

According to several exemplary embodiments, after the chemical treatment agent is melted to a sufficiently low viscosity to allow infusion into the porous ceramic particulates, the melted chemical treatment agent is infused into the porous ceramic particulates using the infusion methods described above.

According to several exemplary embodiments, a method of fracturing a subterranean formation includes injecting a hydraulic fluid into the subterranean formation at a rate and pressure sufficient to open a fracture therein, and a fluid containing a proppant composition comprising porous ceramic particulates infused with a chemical treatment agent and coated with a semi-permeable substantially non-degradable polymer, as described herein and having one or more of the properties as described herein is injected into the fracture to prop the fracture in an open condition.

According to several exemplary embodiments, a method of fracturing a subterranean formation includes injecting a hydraulic fluid into the subterranean formation at a rate and pressure sufficient to open a fracture therein, and a fluid containing a proppant composition comprising porous ceramic particulates infused with a chemical treatment agent without the use of a solvent, as described herein and having one or more of the properties as described herein is injected into the fracture to prop the fracture in an open condition.

The following examples are illustrative of the compositions and methods discussed above.

EXAMPLES

The examples following below were carried out using exemplary materials in order to determine the elution rate of DTPMP (diethylenetriamine penta(methylene phosphonic acid)), a corrosion and scale inhibitor, from porous proppant infused with DTPMP and coated with various polymers and compared to uncoated porous proppant infused with DTPMP. These examples are meant to be illustrative of exemplary embodiments of the present invention and are not intended to be exhaustive.

Example 1

Four 500 gram batches of 20/40 CARBO UltraLite, an ultra-lightweight ceramic proppant having an ASG of 2.71 and having a porosity of 20-25% that is commercially available from CARBO Ceramics, Inc., were each infused with a diethylenetriamine penta(methylene phosphonic acid) ("DTPMP") solution having a solids content of 41%, which is commercially available from Riteks, Inc., and were then coated with a semi-permeable substantially non-degradable polymer in a two-step process as described below.

Each batch of proppant was heated in an oven set to 482° F. (250° C.) for approximately one hour. The heated batches of proppant were then removed from the oven and allowed to cool until they reached a temperature of between 430-440° F. as monitored by a thermocouple. Once the proppant batches reached the desired temperature, 64.2 grams of the DTPMP solution was added to each batch and allowed to infuse into the proppant particulates for approximately three minutes, such that the DTPMP constituted 5% by weight of the infused proppant. After the proppant particulates were infused with DTPMP, each batch was coated with a semi-permeable substantially non-degradable polymer.

The Batch 1 proppant was coated according to the following procedure with a phenol formaldehyde standard reactivity resin that is commercially available from Plastics Engineering Company under the trade name Plenco 14870. Compared to the other phenol formaldehyde resins discussed below, the Plenco 14870 resin had a relatively low viscosity of about 1100 cps at 150° C. After the coating procedure, the Batch 1 proppant included 2% by weight of the polymeric coating.

The Batch 1 proppant was placed in a heated mixing bowl and was monitored with a thermocouple until the proppant reached a temperature of between 410-420° F. When the proppant reached the desired temperature, 8.08 grams of the phenol formaldehyde resin was added to the proppant and allowed to melt and spread over the proppant for approximately 45 seconds. Next, 2.63 grams of a 40% hexamethylenetetramine (which is also known as and will be referred to herein as "hexamine"), solution, and which is commercially available from The Chemical Company, was added to crosslink and cure the phenol formaldehyde resin and was allowed to mix for 1 minute and 25 seconds. Finally, 1.2 grams of a 50-60% cocoamidopropyl hydroxysultaine surfactant, which is commercially available from The Lubrizol Corporation under the trade name "Chembetaine™ CAS", was added and allowed to mix for 1 minute.

The Batch 2 proppant was coated according to the following procedure with a phenol formaldehyde highly reactive, high viscosity polymer resin that is commercially available from Plastics Engineering Company under the trade name Plenco 14750. Compared to the other phenol formaldehyde resins discussed above and below, the Plenco 14750 resin had a relatively high viscosity of about 34,900 cps at 150° C. After the coating procedure, the Batch 2 proppant included 2% by weight of the polymeric coating.

The Batch 2 proppant was placed in a heated mixing bowl and was monitored with a thermocouple until the proppant reached a temperature of between 410-420° F. When the proppant reached the desired temperature, 8.08 grams of the phenol formaldehyde resin was added to the proppant and allowed to melt and spread over the proppant for approximately 45 seconds. Next, 2.63 grams of a 40% hexamine solution, which is commercially available from The Chemical Company, was added to crosslink and cure the phenol formaldehyde resin and was allowed to mix for 1 minute and 25 seconds. Finally, 1.2 grams of a 50-60% cocoamidopropyl hydroxysultaine surfactant, which is commercially available from The Lubrizol Corporation under the trade name "Chembetaine™ CAS", was added and allowed to mix for 1 minute.

The Batch 3 proppant was coated according to the following procedure with the phenol formaldehyde highly reactive, high viscosity polymer resin mentioned above that is commercially available from Plastics Engineering Company under the trade name Plenco 14750. As discussed above, the Plenco 14750 resin had a relatively high viscosity of about 34,900 cps at 150° C. After the coating procedure, the Batch 3 proppant included 4% by weight of the polymeric coating.

The Batch 3 proppant was placed in a heated mixing bowl and was monitored with a thermocouple until the proppant reached a temperature of between 410-420° F. When the proppant reached the desired temperature, 17.61 grams of the phenol formaldehyde resin was added to the proppant and allowed to melt and spread over the proppant for approximately 45 seconds. Next, 5.72 grams of a 40% hexamine solution, which is commercially available from The Chemical Company, was added to crosslink and cure the phenol formaldehyde resin and was allowed to mix for 1 minute and 25 seconds. Finally, 1.2 grams of a 50-60% cocoamidopropyl hydroxysultaine surfactant, which is commercially available from The Lubrizol Corporation under the trade name "Chembetaine™ CAS", was added and allowed to mix for 1 minute.

The Batch 4 proppant was coated according to the following procedure with a polyurethane polymer that is made by reacting a polyisocyanate resin with a curing agent both of which are commercially available from Air Products, Inc. under the trade names ANCAREZ® ISO HDiT and AMICURE® IC221, respectively. After the coating procedure, the Batch 4 proppant included 4% by weight of the polyurethane polymeric coating.

The Batch 4 proppant was placed in a mixing bowl that was maintained at room temperature. At room temperature, 13.5 grams of the curing agent AMICURE® IC221 was added to the proppant batch and mixed for one minute. After one minute, 7.2 grams of the ANCAREZ® ISO HDiT polyisocyanate resin was added to the proppant batch and mixed with the proppant for approximately 5 minutes.

A fifth proppant batch was then prepared that included 1000 grams of 20/40 CARBO UltraLite ceramic proppant. The Batch 5 proppant was infused with DTPMP and coated in a one-step thermal infusion process with a phenol formaldehyde highly reactive, low viscosity polymer resin that is commercially available from Plastics Engineering Company under the trade name Plenco 14862. Compared to the other phenol formaldehyde resins discussed above and below, the Plenco 14862 resin had a relatively low viscosity of about 1080 cps at 150° C. After the one-step thermal infusion process, the Batch 5 proppant included 2% by weight of the polymeric coating.

The Batch 5 ceramic proppant was heated in an oven set to 482° F. (250° C.) for approximately one hour. The heated batch of proppant was then removed from the oven and allowed to cool until it reached a temperature of between 430-440° F. as monitored by a thermocouple. Once the proppant batch reached the desired temperature, 128.4 grams of the DTPMP solution was added to the batch and allowed to infuse into the proppant particulates for approximately 5 seconds, such that the DTPMP constituted 5% by weight of the infused proppant. After 5 seconds had elapsed, 17.35 grams of the phenol formaldehyde, high reactivity, low viscosity polymer resin (Plenco 14862) was added to the proppant batch. After another 5 seconds had elapsed, 5.64 grams of a 40% hexamine solution, which is commercially available from The Chemical Company, was added to cross-link and cure the phenol formaldehyde resin and was allowed to mix for 10 minutes and 15 seconds. Finally, 1.2 grams of a 50-60% cocoamidopropyl hydroxysultaine surfactant, which is commercially available from The Lubrizol Corporation under the trade name "Chembetaine™ CAS", was added and allowed to mix for another 30 seconds.

Finally, a sixth proppant batch was prepared as a control. The Batch 6 control proppant batch, included 1000 grams of 20/40 CARBO UltraLite ceramic proppant and was infused with DTPMP but did not include a polymeric coating.

The Batch 6 ceramic proppant was heated in an oven set to 482° F. (250° C.) for approximately one hour. The heated batch of proppant was then removed from the oven and allowed to cool until it reached a temperature of between 430-440° F. as monitored by a thermocouple. Once the proppant batch reached the desired temperature, 241.8 grams of the DTPMP solution was added to the batch and allowed to infuse into the proppant particulates for approximately 3 minutes, such that the DTPMP constituted 9% by weight of the infused proppant.

Table 1 below represents the 6 batches prepared for Example 1.

TABLE 1

Example 1 Batches

| Batch Number | Infusant/Polymer Coating |
|---|---|
| Batch 1 | 5% by weight DTPMP, 2% by weight phenol formaldehyde, standard reactivity, low viscosity (Plenco 14870) |
| Batch 2 | 5% by weight DTPMP, 2% by weight phenol formaldehyde, high reactivity, high viscosity (Plenco 14750) |
| Batch 3 | 5% by weight DTPMP, 4% by weight phenol formaldehyde, high reactivity, high viscosity (Plenco 14750) |
| Batch 4 | 5% by weight DTPMP, 4% by weight polyurethane |
| Batch 5 | 5% by weight DTPMP, 2% by weight phenol formaldehyde, high reactivity, low viscosity (Plenco 14862) |
| Batch 6 | 9% by weight DTPMP, no coating |

Proppant Batches 1-6 were then placed in a seawater eluent for one hour. The seawater eluent was prepared according to the ASTM D1141-98(2013) procedure and had the composition shown below in Table 2.

TABLE 2

| ION & SALT | ION CONC. (mg/L) |
|---|---|
| $K^+$ as KCl | 403.0 |
| $Mg^{2+}$ as $MgCl_2 \cdot 6H_2O$ | 657.0 |
| $Na^+$ as NaCl | 10025.6 |
| $HCO_3^-$ as $NaHCO_3$ | 159.0 |

TABLE 2-continued

| ION & SALT | ION CONC. (mg/L) |
|---|---|
| $Na^+$ as $NaHCO_3$ | 59.9 |
| $SO_4^{2-}$ as $Fe_2SO_4 \cdot 7H_2O$ | 0.0 |
| $SO_4^{2-}$ as $Na_2SO_4 \cdot 10H_2O$ | 1308.0 |
| $Na^+$ as $Na_2SO_4 \cdot 10H_2O$ | 626.1 |
| $Ca^{2+}$ as $CaCl_2 \cdot 2H_2O$ | 329.0 |
| $Sr^{2+}$ as $SrCl_2 \cdot 6H_2O$ | 7.0 |
| $Ba^{2+}$ as $BaCl_2 \cdot 2H_2O$ | 0.0 |
| Fe(II) as $FeCl_2 \cdot 4H_2O$ | 0.0 |
| Fe(II) as $FeSO_4 \cdot 7H_2O$ | 0.0 |
| $CH_3COO^-$ as $CH_3COONa \cdot 3H_2O$ | 1.0 |
| $Na^+$ as $CH3COONa$ | 0.4 |
| Total $SO_4^{2-}$ | 1308.0 |
| Total $Na^+$ | 10712.0 |
| $Cl^-$ from analysis (mg/L) = | 18330.0 |
| $Cl^-$ from calculation (mg/L) = | 18330.0 |
| Error (%) = | 0.00% |
| Total Salt Weight (mg/L) = | 37591 |
| Salt Concentration (%) = | 3.76% |

After one hour, the eluent was tested for the amount of DTPMP (in parts per million, ppm) present. For each of proppant Batches 1-5, the eluent was subsequently tested for the presence of DTPMP at 2, 3, 6, 25, 27.5, 29.5, and 97.5 hours, respectively. For proppant Batch 1, the eluent was additionally tested for the presence of DTPMP at 100, 102, 104.5 and 120.5 hours. For Batch 6, the eluent was subsequently tested for the presence of DTPMP at 2, 3, 4, 5, 21, 22, 23, 24, 26, 27, 28, 29, 44, 47, 49, 53, 70 and 74 hours.

Figure 3:
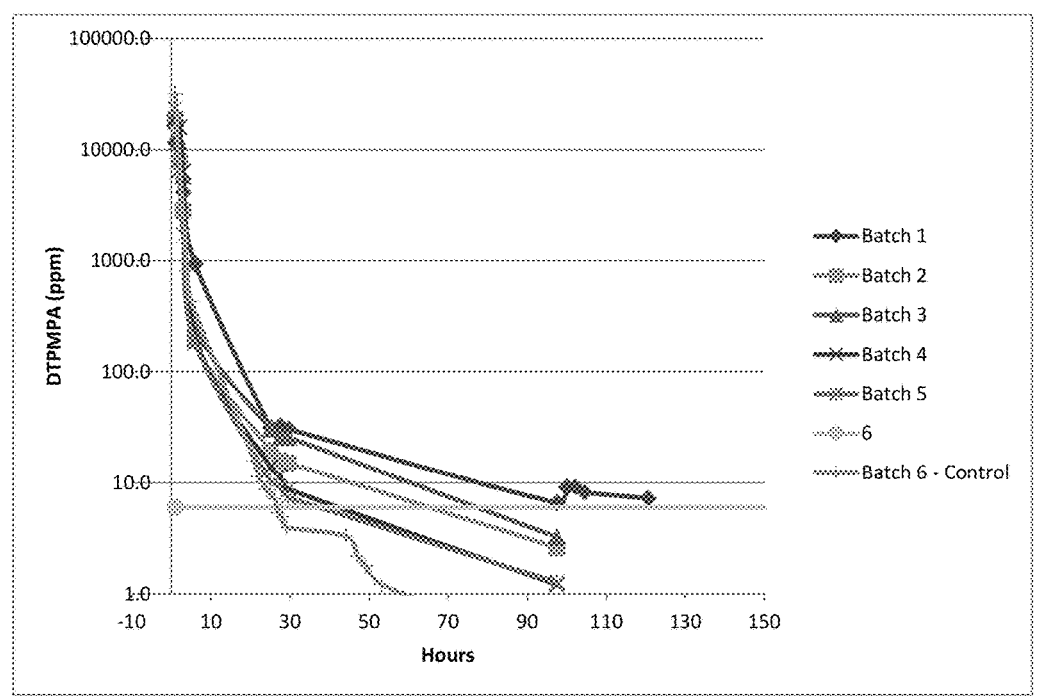
FIG. 3 is a graph of an elution profile for Example 1 in terms of DTPMP (diethylenetriamine penta(methylene phosphonic acid)) in parts per million (ppm) released as a function of time for porous ceramic proppant infused with DTPMP and encapsulated with various coatings.

The amount of DTPMP in ppm detected in the eluent was plotted as a function of time to obtain the elution profile curves shown in FIG. 3. In FIG. 3, a line has been drawn at 6 ppm which represents the minimum effective concentration of DTPMP as a corrosion and scale inhibitor. By plotting the amount of detected DTPMP in the eluent versus time for proppant Batches 1-6 and comparing these results with the 6 ppm line, the length of time a particular proppant batch elutes an effective amount of DTPMP can be determined.

FIG. 3 clearly shows that proppant Batches 1-5 which included a semi-permeable substantially non-degradable polymeric coating eluted an effective amount of DTPMP for a longer period of time compared to proppant Batch 6 which did not include a semi-permeable substantially non-degradable polymeric coating. FIG. 3 also clearly shows that for the three proppant batches that were infused with 5% by weight of DTPMP and coated with 2% by weight of phenol formaldehyde according to the two-step process, namely proppant Batches 1-3, the lower the viscosity of the resin used to make the phenol formaldehyde polymeric coating, the longer the period of time in which an effective amount of DTPMP was eluted. In addition, FIG. 3 shows that when phenol formaldehyde resins having relatively low viscosity are used to prepare the polymeric coating, the proppant coated according to the two-step process (Batch 1) eluted an effective amount of DTPMP for a longer period of time compared to proppant coated according to the one-step process (Batch 5). Finally, FIG. 3 shows that for the three proppant batches that were infused with 5% by weight of DTPMP and coated with 2% or 4% by weight of phenol formaldehyde according to the two-step process, namely proppant Batches 1-3, an effective amount of DTPMP was eluted for a longer period of time compared to proppant that was infused with 5% by weight of DTPMP and coated with 2% by weight of polyurethane according to the two-step process.

Example 2

Three 1000 pound plant batches of 20/40 CARBO Ultra-Lite, referred to below as Batches 7-9, were infused with the DTPMP solution mentioned above in Example 1 and were then coated according to the following procedure with a phenol formaldehyde standard reactivity resin that is commercially available from Plastics Engineering Company under the trade name Plenco 14941. Compared to the other phenol formaldehyde resins discussed above, the Plenco 14941 resin had a relatively medium viscosity of about 1850 cps at 150° C.

Each of Batches 7-9 were infused with 183.6 pounds of the DTPMP solution, such that the DTPMP constituted 7% by weight of the infused proppant. The proppant of Batches 7-9 was then coated with the phenol formaldehyde standard reactivity, medium viscosity polymer resin (Plenco 14941), in a two-step process. After the two-step process, the Batch 7 proppant included 0.5% by weight of the polymeric coating, the Batch 8 proppant included 1.0% by weight of the polymeric coating and the Batch 9 proppant included 2.0% by weight of the polymeric coating.

After the proppant particulates were infused with 7% DTPMP, each batch was coated with a different amount of the same semi-permeable substantially non-degradable polymer. The Batch 7 proppant was heated to 415° F. When the proppant reached the desired temperature, 6.6 pounds of the phenol formaldehyde, standard reactivity, medium viscosity polymer resin (Plenco 14941) was added to the proppant and allowed to melt and spread over the proppant for approximately 45 seconds. Next, 2.8 pounds of a 30% hexamine solution, and which is commercially available from The Chemical Company, was added to crosslink and cure the phenol formaldehyde resin and was allowed to mix for 25 seconds. Finally, 0.5 pound of a 50-60% cocoamidopropyl hydroxysultaine surfactant, which is commercially available from The Lubrizol Corporation under the trade name "Chembetaine™ CAS" was added and allowed to mix.

The Batch 8 proppant was heated to 415° F. When the proppant reached the desired temperature, 12.3 pounds of the phenol formaldehyde, standard reactivity, medium viscosity polymer resin (Plenco 14941) was added to the proppant and allowed to melt and spread over the proppant for approximately 45 seconds. Next, 5.2 pounds of a 30% hexamine solution, and which is commercially available from The Chemical Company, was added to crosslink and cure the phenol formaldehyde resin and was allowed to mix for 25 seconds. Finally, 0.5 pound of a 50-60% cocoamidopropyl hydroxysultaine surfactant, which is commercially available from The Lubrizol Corporation under the trade name "Chembetaine™ CAS" was added and allowed to mix.

The Batch 9 proppant was heated to 415° F. When the proppant reached the desired temperature, 22.7 pounds of the phenol formaldehyde, standard reactivity, medium viscosity polymer resin (Plenco 14941) was added to the proppant and allowed to melt and spread over the proppant for approximately 45 seconds. Next, 9.7 pounds of a 30% hexamine solution, and which is commercially available from The Chemical Company, was added to crosslink and cure the phenol formaldehyde resin and was allowed to mix for 25 seconds. Finally, 0.5 pounds of a 50-60% cocoamidopropyl hydroxysultaine surfactant, which is commercially available from The Lubrizol Corporation under the trade name "Chembetaine™ CAS" was added and allowed to mix.

Proppant Batches 7-9 of Example 2 were compared with proppant Batches 1, 2 and 6 from Example 1, as indicated in Table 3 below.

TABLE 3

Example 2 Batches

| Batch Number | Infusant/Polymer Coating |
| --- | --- |
| Batch 1 (from Example 1) | 5% by weight DTPMP, 2% by weight phenol formaldehyde, standard reactivity, low viscosity (Plenco 14870) |
| Batch 2 (from Example 1) | 5% by weight DTPMP, 2% by weight phenol formaldehyde, high reactivity, high viscosity (Plenco 14750) |
| Batch 6 (from Example 1) | 9% by weight DTPMP, no coating |
| Batch 7 | 7% by weight DTPMP, 0.5% by weight phenol formaldehyde, standard reactivity, medium viscosity (Plenco 14941) |
| Batch 8 | 7% by weight DTPMP, 1.0% by weight phenol formaldehyde, standard reactivity, medium viscosity (Plenco 14941) |
| Batch 9 | 7% by weight DTPMP, 2.0% by weight phenol formaldehyde, standard reactivity, medium viscosity (Plenco 14941) |

Proppant Batches 7-9 were then placed in a seawater eluent for one hour. The seawater eluent was prepared according to the ASTM D1141-98(2013) procedure and had the composition shown above in Table 2. After one hour, the eluent was tested for the amount of DTPMP present. The eluent was subsequently tested for the presence of DTPMP at 2, 3, 4, 5, 6, 7, 8, 25, 29, 33, and 48.5 hours, respectively. For proppant Batch 9, the eluent was additionally tested for the presence of DTPMP at 53.5 and 55.5 hours. For Batches 1, 2 and 6, the eluent was subsequently tested for the presence of DTPMP as described above in Example 1.

Figure 4:
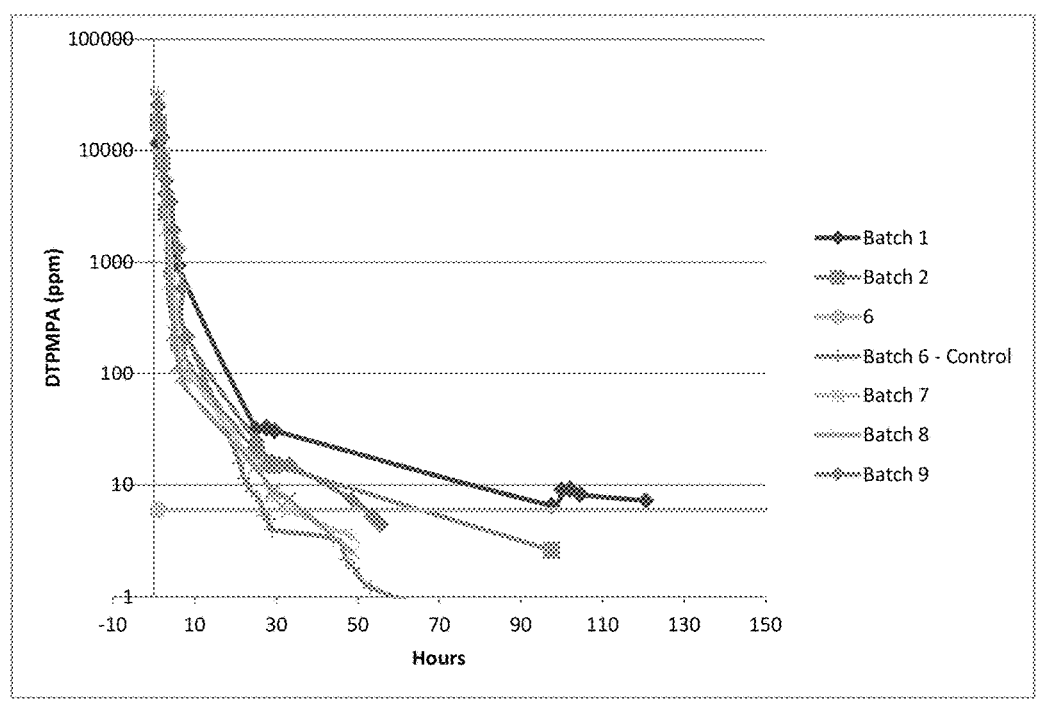
FIG. 4 is a graph of the elution profile for Example 2 in terms of the ppm of DTPMP released as a function of time for porous ceramic proppant infused with DTPMP and encapsulated with various coatings.

The amount of DTPMP in ppm detected in the eluent for Batches 7-9 was plotted with the data from Batches 1, 2 and 6 from Example 1 as a function of time to obtain the elution profile curves shown in FIG. 4. In FIG. 4, a line has been drawn at 6 ppm which represents the minimum effective concentration of DTPMP as a corrosion and scale inhibitor. By plotting the amount of detected DTPMP in the eluent versus time for proppant Batches 1-2 and 6-9 and comparing these results with the 6 ppm line, the length of time a particular proppant batch elutes an effective amount of DTPMP can be determined.

FIG. 4 clearly shows that proppant Batches 7-9 which included a semi-permeable substantially non-degradable polymeric coating eluted an effective amount of DTPMP for a longer period of time compared to proppant Batch 6 which did not include a semi-permeable substantially non-degradable polymeric coating. In addition, FIG. 4 clearly shows that for the three proppant batches that were infused with 7% by weight of DTPMP and coated with 0.5%, 1.0% and 2.0% by weight of phenol formaldehyde according to the two-step process, namely proppant Batches 7-9, an effective amount of DTPMP was eluted for a longer period of time the higher the percent by weight of the phenol formaldehyde polymeric coating.

Example 3

A 500 gram batch of 20/40 CARBO UltraLite, referred to below as Batch 10 was infused with 64.2 grams of the DTPMP solution mentioned above in Example 1, such that the DTPMP constituted 5% by weight of the infused proppant and was then coated with polylactic acid such that the final product included 2% by weight of the polylactic acid coating in a two-step thermal process. Polylactic acid is a degradable polymeric coating that is commercially available from Danimer under the trade name of "92938". 500 grams of the 20/40 CARBO UltraLite was heated in an oven set at 250° C. for one hour. 64.2 grams of the DTPMP solution was added to the heated proppant and allowed to mix for 3 minutes. The infused proppant was then heated to 193° C. and 51.0 grams of the polylactic acid polymer resin was added to the batch and allowed to mix for approximately ten minutes.

A 500 gram batch of 20/40 CARBO UltraLite, referred to below as Batch 11 was infused with DTPMP and coated with a polyurethane coating according to the procedure discussed above, except that 3.6 grams of the Ancarez ISO HDiT polyisocyanate polymer resin was used to result in a 2% by weight coating of polyurethane.

Proppant Batches 10 and 11 were compared with proppant Batches 1 and 6 from Example 1, as indicated in Table 4 below.

TABLE 4

Example 3 Batches

| Batch Number | Infusant/Polymer Coating |
|---|---|
| Batch 1 | 5% by weight DTPMP, 2% by weight phenol formaldehyde, standard reactivity, low viscosity (Plenco 14870) |
| Batch 6 | 5% by weight DTPMP, no coating |
| Batch 10 | 5% by weight DTPMP, 2% by weight polylactic acid |
| Batch 11 | 5% by weight DTPMP, 2% by weight polyurethane |

Proppant Batches 1, 6, 10 and 11 were then placed in a seawater eluent for one hour. The seawater eluent was prepared according to the ASTM D114198(2013) procedure and had the composition shown above in Table 2. After one hour, the eluent was tested for the amount of DTPMP present. The eluent was subsequently tested for the presence of DTPMP at 2, 3, 4, 5, 21, 22, 23, 24, 26, 27, 28, 29, 44, 47, 49, 53, 70 and 74 hours, respectively. For proppant Batch 1, the eluent was additionally tested for the presence of DTPMP at 93, 98, 165, 173, 189.5, 197.5 and 218 hours.

Figure 5:
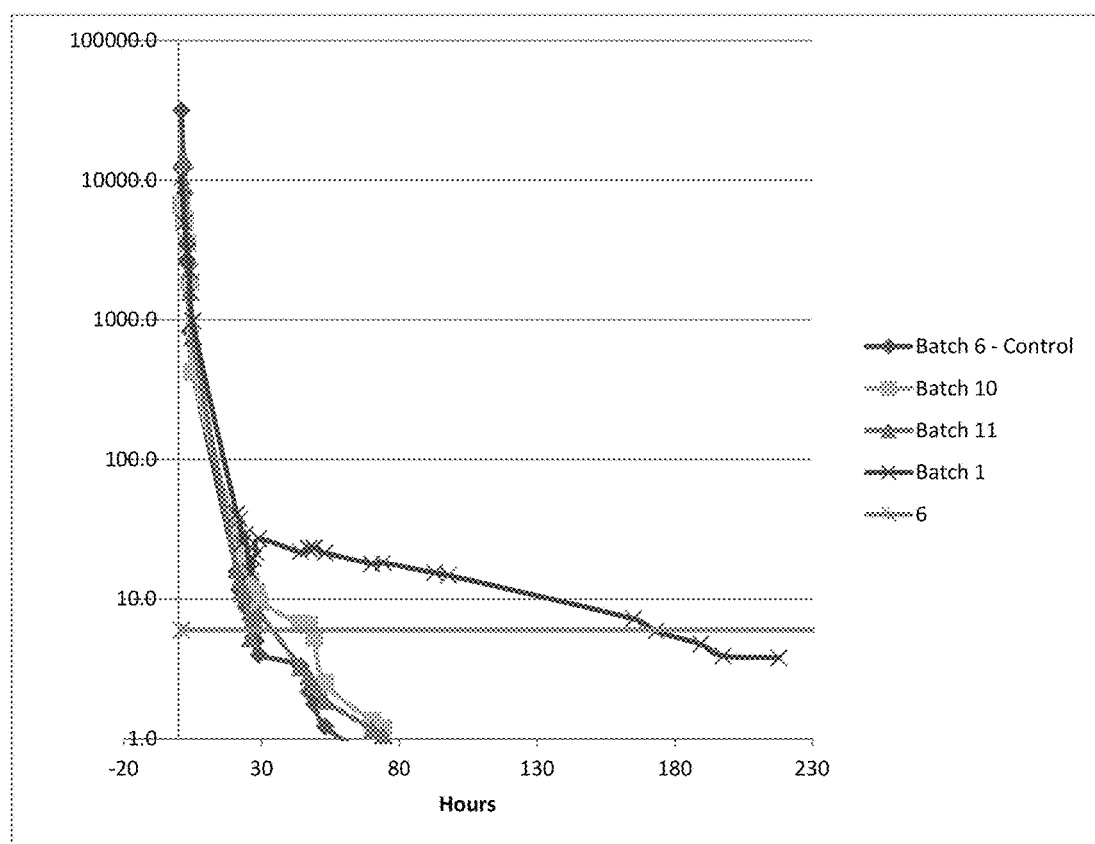
FIG. 5 is a graph of the elution profile for Example 3 in terms of the ppm of DTPMP released as a function of time for porous ceramic proppant infused with DTPMP and encapsulated with various coatings.

The amount of DTPMP in ppm detected in the eluent was plotted as a function of time to obtain the elution profile curves shown in FIG. 5. In FIG. 5, a line has been drawn at 6 ppm which represents the minimum effective concentration of DTPMP as a corrosion and scale inhibitor. By plotting the amount of detected DTPMP in the eluent versus time for proppant Batches 1, 6, 10 and 11 and comparing these results with the 6 ppm line, the length of time a particular proppant batch elutes an effective amount of DTPMP can be determined.

FIG. 5 clearly shows that proppant Batch 1 which was infused with 5% by weight of DTPMP and coated with 2% by weight of phenol formaldehyde according to the two-step process eluted an effective amount of DTPMP for a longer period of time compared to proppant Batches 10 and 11 which were infused with 5% by weight of DTPMP and coated with 2.0% by weight of polylactic acid and polyurethane, respectively. In addition, FIG. 5 shows that proppant Batches 10 and 11 which included a degradable and a semi-permeable substantially non-degradable polymeric coating, respectively, eluted an effective amount of DTPMP for a longer period of time compared to proppant Batch 6 which did not include a semi-permeable substantially non-degradable polymeric coating. FIG. 5 also shows that substantially similar results were obtained for proppant Batch 10, that was infused with 5% by weight of DTPMP and coated with 2.0% by weight of polylactic acid, a degradable polymer and proppant Batch 11 that was infused with 5% by weight of DTPMP and coated with 2.0% by weight of polyurethane, a semi-permeable substantially non-degradable polymer.

The above results show that proppants coated with a semi-permeable substantially non-degradable polymer, like phenol formaldehyde and polyurethane, release effective amounts of chemical treatment agents like DTPMP for a longer period of time than typical degradable coatings or proppant without any coating at all.

While the present invention has been described in terms of several exemplary embodiments, those of ordinary skill in the art will recognize that the invention can be practiced with modification within the spirit and scope of the appended claims.

The present disclosure has been described relative to a several exemplary embodiments. Improvements or modifications that become apparent to persons of ordinary skill in the art only after reading this disclosure are deemed within the spirit and scope of the application. It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A ceramic proppant composition for use in hydraulic fracturing, the composition comprising:
   non-porous particulates having a permeability of at least about 300 D at 4,000 psi closure stress; and
   porous ceramic particulates having an internal interconnected porosity of from about 5% to about 35% and comprising a chemical treatment agent disposed within the porous ceramic particulates and a polymer coating that is a reaction product of a cross-linker and a phenol formaldehyde polymer, the phenol formaldehyde polymer having a viscosity of from about 1100 cps to about 1850 cps at 150° C., wherein the polymer coating is configured to permit the chemical treatment agent to elute therethrough, wherein the ceramic proppant composition is formed by infusing the chemical treatment agent within the porous ceramic particulates at a first temperature of from 430° F. to 440° F. and coating the infused porous ceramic particulates with the polymer coating at a second temperature of from 410° F. to 420°.

2. The composition of claim 1, wherein the porous ceramic particulates comprise an intermediate density ceramic non-porous proppant.

3. The composition of claim 1, wherein the porous ceramic particulates comprise a high density ceramic porous proppant.

4. The composition of claim 1, wherein the chemical treatment agent comprises one or more scale inhibitors.

5. The composition of claim 1, wherein the chemical treatment agent comprises a chemical tracer.

6. The composition of claim 5, wherein the chemical tracer comprises a biological marker.

7. The composition of claim 6, wherein the biological marker comprises DNA.

8. The composition of claim 5, wherein the chemical tracer comprises at least one of metallic and non-metallic nanoparticles.

9. The composition of claim 8, wherein the nanoparticles are configured to alter wettability of the ceramic proppant composition in a hydraulic fracture environment.

10. The composition of claim 1, wherein the chemical treatment agent is a surfactant configured to alter wettability of the ceramic proppant composition in a hydraulic fracture environment.

11. The composition of claim 1, wherein the phenol formaldehyde polymer has a viscosity of about 1100 cps at 150° C.

12. The composition of claim 11, wherein the chemical treatment agent comprises one or more scale inhibitors comprising diethylenetriamine penta(methylene phosphonic acid).

13. A ceramic proppant composition for use in hydraulic fracturing, the composition comprising:
porous ceramic particulates;
a chemical treatment agent disposed within the porous ceramic particulates; and
a polymer coating that is a reaction product of a crosslinker and a phenol formaldehyde polymer, the phenol formaldehyde polymer having a viscosity of from about 1100 cps to about 1850 cps at 150° C., wherein the polymer coating is configured to permit the chemical treatment agent to elute therethrough, wherein the ceramic proppant composition is formed by infusing the chemical treatment agent within the porous ceramic particulates at a first temperature of from 430° F. to 440° F. and coating the infused porous ceramic particulates with the polymer coating at a second temperature of from 410° F. to 420° F.

14. The composition of claim 13, wherein the porous ceramic particulates comprise a high density ceramic porous proppant.

15. The composition of claim 13, wherein the chemical treatment agent further comprises a tracer material comprising a chemical tracer selected from the group consisting of dyes, fluorescent materials, metallic nano-particles, non-metallic nano-particles and biological markers.

16. The composition of claim 15, wherein the chemical tracer comprises DNA.

17. The composition of claim 13, further comprising non-porous ceramic particulates.

18. The composition of claim 15, wherein the tracer material comprises at least one of metallic nano-particles and non-metallic nano-particles.

19. A ceramic proppant composition for use in hydraulic fracturing, the composition comprising:
porous ceramic particulates;
a chemical treatment agent disposed within the porous ceramic particulates, the chemical treatment agent comprising one or more scale inhibitors; and
a polymer coating that is a reaction product of a crosslinker and a phenol formaldehyde polymer, the phenol formaldehyde polymer having a viscosity of from about 1100 cps to about 1850 cps at 150° C., wherein the polymer coating is configured to permit the chemical treatment agent to elute therethrough, wherein the ceramic proppant composition is formed by infusing the chemical treatment agent within the porous ceramic particulates at a first temperature of from 430° F. to 440° F. and coating the infused porous ceramic particulates with the polymer coating at a second temperature of from 410° F. to 420° F.

20. The composition of claim 19, further comprising non-porous ceramic particulates and wherein the porous ceramic particulates comprise an intermediate density ceramic porous proppant.

21. The composition of claim 19, wherein the chemical treatment agent comprises at least one of a paraffin inhibitor and a wax inhibitor.

22. The composition of claim 21, wherein the at least one of a paraffin inhibitor and a wax inhibitor comprises an ethylene vinyl acetate copolymer.

23. A ceramic proppant composition for use in hydraulic fracturing, the composition comprising:
porous ceramic particulates;
a water-soluble chemical treatment agent in the porous ceramic particulates; and
a polymer coating that is a reaction product of a crosslinker and a phenol formaldehyde polymer, the phenol formaldehyde polymer having a viscosity of from about 1100 cps to about 1850 cps at 150° C., and the polymer coating further comprising a hydrocarbon-soluble chemical treatment agent, wherein the polymer coating is configured to permit the water-soluble chemical treatment agent to elute therethrough, wherein the ceramic proppant composition is formed by infusing the water-soluble chemical treatment agent within the porous ceramic particulates at a first temperature of from 430° F. to 440° F. and coating the infused porous ceramic particulates with the polymer coating at a second temperature of from 410° F. to 420°.

24. The composition of claim 23, further comprising non-porous ceramic particulates and wherein the porous ceramic particulates are selected from the group consisting of light weight ceramic porous proppant, intermediate density ceramic porous proppant, and high density ceramic porous proppant.

25. The composition of claim 23, wherein the water-soluble chemical treatment agent comprises a scale inhibitor and the hydrocarbon-soluble chemical treatment agent comprises a paraffin inhibitor.

26. The composition of claim 1, wherein the porous ceramic particulates have an internal interconnected porosity that is infused with the chemical treatment agent.

27. The composition of claim 1, wherein the non-porous particulates have a porosity of less than 5% and the porous ceramic particulates have an internal interconnected porosity of about 15% to about 35%.

28. The composition of claim 1, wherein the chemical treatment agent is configured to elute from the porous ceramic particulates upon contact with water.

29. The composition of claim 1, wherein the composition has a conductivity that is at least about 90% of the conductivity of the non-porous particulates.

30. The composition of claim 1, wherein the composition has a conductivity that is at least about 95% of the conductivity of the non-porous particulates.

31. The composition of claim 13, wherein the porous ceramic particulates have an internal interconnected porosity of greater than about 5%, and wherein the internal interconnected porosity is infused with the chemical treatment agent.

32. The composition of claim 13, wherein the porous ceramic particulates have an internal interconnected porosity of about 15% to about 35%.

33. The composition of claim 13, wherein the chemical treatment agent is configured to elute from the porous ceramic particulates upon contact with water.

34. The composition of claim 13, wherein the composition is formed by disposing the chemical treatment agent in the porous ceramic particulates without the use of a solvent.

35. The composition of claim 34, wherein the composition is formed by heating the chemical treatment agent to a viscosity of from about 1,000 to about 10,000 cps prior to infusing the chemical treatment agent into the porous ceramic particulates.

36. The composition of claim 19, wherein the porous ceramic particulates have an internal interconnected porosity of greater than about 5%.

37. The composition of claim 19, wherein the porous ceramic particulates have an internal interconnected porosity of about 15% to about 35%.

38. The composition of claim 19, wherein the chemical treatment agent is configured to elute from the porous ceramic particulates upon contact with water.

39. The composition of claim 19, wherein the composition is formed by heating the chemical treatment agent to a viscosity of from about 1,000 to about 10,000 cps followed by infusing the chemical treatment agent into the porous ceramic particulates.

40. The composition of claim 13, wherein the polymer coating is from about 0.5 wt % to about 4 wt % of the ceramic proppant composition.

41. The composition of claim 40, wherein the polymer coating is about 2 wt % of the ceramic proppant composition.

42. The composition of claim 19, wherein the chemical treatment agent is from about 5 wt % to about 9 wt % of the ceramic proppant composition.

43. The composition of claim 42, wherein the chemical treatment agent is about 7 wt % of the ceramic proppant composition.

44. The composition of claim 13, wherein the cross-linker is hexamethylenetetramine.

45. The composition of claim 1, wherein the cross-linker is hexamethylenetetramine.

* * * * *